United States Patent [19]
Wilkinson et al.

[11] Patent Number: 5,630,162
[45] Date of Patent: May 13, 1997

[54] ARRAY PROCESSOR DOTTED COMMUNICATION NETWORK BASED ON H-DOTS

[75] Inventors: Paul A. Wilkinson, Apalachin; Peter M. Kogge, Endicott, both of N.Y.

[73] Assignee: International Business Machines Corporation, Armonk, N.Y.

[21] Appl. No.: 430,708

[22] Filed: Apr. 27, 1995

Related U.S. Application Data

[63] Continuation of Ser. No. 887,997, May 22, 1992, abandoned, which is a continuation-in-part of Ser. No. 611,594, Nov. 13, 1990, abandoned, which is a continuation-in-part of Ser. No. 798,788, Nov. 27, 1991, abandoned.

[51] Int. Cl.$^6$ .................................................. G06F 15/16
[52] U.S. Cl. .................... 395/800; 364/131; 364/DIG. 1; 364/228.7; 364/231.9
[58] Field of Search .................................. 395/200, 800, 395/725, 200.1, 200.02; 364/734–736, 131, 133; 370/94.1–94.3, 60, 86

[56] References Cited

U.S. PATENT DOCUMENTS

| | | | |
|---|---|---|---|
| 3,537,074 | 10/1970 | Stokes et al. | 340/172 |
| 3,544,973 | 12/1970 | Borck et al. | 340/172.5 |
| 3,970,993 | 7/1976 | Finnila | 340/172.5 |
| 4,101,960 | 7/1978 | Stokes et al. | 364/200 |
| 4,107,773 | 8/1978 | Gilbreath et al. | 364/200 |
| 4,270,170 | 5/1981 | Reddaway | 364/200 |
| 4,314,349 | 2/1982 | Batcher | 364/716 |
| 4,338,675 | 7/1982 | Palmer et al. | 364/748 |
| 4,380,046 | 4/1983 | Fung | 364/200 |
| 4,394,726 | 7/1983 | Kohl | 364/200 |
| 4,412,303 | 10/1983 | Barnes et al. | 364/900 |
| 4,435,758 | 3/1984 | Lorie et al. | 364/200 |
| 4,467,422 | 8/1984 | Hunt | 364/200 |
| 4,468,727 | 8/1984 | Carrison | 364/200 |
| 4,498,133 | 2/1985 | Bolton et al. | 364/200 |

(List continued on next page.)

FOREIGN PATENT DOCUMENTS

| | | |
|---|---|---|
| 0132926 | 2/1985 | European Pat. Off. . |
| 208457A2 | 6/1986 | European Pat. Off. . |
| 0208497 | 6/1986 | European Pat. Off. . |
| 340668A2 | 4/1989 | European Pat. Off. . |
| 428327A1 | 11/1990 | European Pat. Off. . |
| 429733A2 | 6/1991 | European Pat. Off. . |
| 460599A3 | 12/1991 | European Pat. Off. . |
| 485690A2 | 5/1992 | European Pat. Off. . |
| 493876A2 | 7/1992 | European Pat. Off. . |
| 2223867 | 4/1990 | United Kingdom . |
| 89/09967 | 4/1988 | WIPO . |
| 92/06436 | 4/1992 | WIPO . |

OTHER PUBLICATIONS

T.A. Kriz and M.J. Marple, "Multi–Port Bus Structure With Fast Shared Memory", IBM Technical Disclosure Bulletin, vol. 27, No. 10A, pp. 5579–5580, Mar. 1985.

(List continued on next page.)

*Primary Examiner*—Mehmet B. Geckil
*Attorney, Agent, or Firm*—Lynn L. Augspurger; David V. Rossi

[57] ABSTRACT

A parallel processor array of the SIMD or MIMD type requires a highly organized communication network for communication between processing elements (PEs). For a communication network a dotted network structure is created which reduces the magnitude of the the networking implementation using a link with two vertical paths and two horizontal paths for a single link, denominated H-DOT. A significant result of the H-DOT network configuration is that it applies to several topologies, and furthermore, the array of processors can generally be extended in size and in additional dimensions while retaining the basic two port array processing element. Both synchronous and routed control can be included. Routing algorithm routines are discussed. The network configuration can be used in massively parallel processors or other smaller array processors which can implement SIMD and MIMD processes.

18 Claims, 9 Drawing Sheets

U.S. PATENT DOCUMENTS

| | | | |
|---|---|---|---|
| 4,523,273 | 6/1985 | Adams, III et al. | 364/200 |
| 4,598,400 | 7/1986 | Hillis | 370/60 |
| 4,604,695 | 8/1986 | Widen et al. | 364/200 |
| 4,621,339 | 11/1986 | Wagner et al. | 364/200 |
| 4,622,650 | 11/1986 | Kulisch | 364/748 |
| 4,706,191 | 11/1987 | Hamstra et al. | 364/200 |
| 4,720,780 | 1/1988 | Dolecek | 364/200 |
| 4,736,291 | 4/1988 | Jennings et al. | 364/200 |
| 4,739,474 | 4/1988 | Holsztynski | 364/200 |
| 4,739,476 | 4/1988 | Fiduccia | 364/200 |
| 4,748,585 | 5/1988 | Chiarulli | 364/900 |
| 4,763,321 | 8/1988 | Calvignac et al. | 370/94 |
| 4,780,873 | 10/1988 | Mattheyses | 370/94 |
| 4,783,738 | 11/1988 | Li et al. | 364/200 |
| 4,783,782 | 11/1988 | Morton | 371/11 |
| 4,805,091 | 2/1989 | Thiel et al. | 364/200 |
| 4,809,159 | 2/1989 | Sowa | 364/200 |
| 4,809,169 | 2/1989 | Sfarti et al. | 364/200 |
| 4,809,347 | 2/1989 | Nash et al. | 382/49 |
| 4,814,980 | 3/1989 | Peterson et al. | 364/200 |
| 4,825,359 | 4/1989 | Ohkami et al. | 364/200 |
| 4,831,519 | 5/1989 | Morton | 364/200 |
| 4,835,729 | 5/1989 | Morton | 364/200 |
| 4,837,739 | 6/1989 | McGill et al. | 371/8 |
| 4,841,476 | 6/1989 | Mitchell et al. | 364/900 |
| 4,847,755 | 7/1989 | Morrison et al. | 364/200 |
| 4,849,882 | 7/1989 | Aoyama et al. | 364/200 |
| 4,852,048 | 7/1989 | Morton | 364/200 |
| 4,855,903 | 8/1989 | Carleton et al. | 395/325 |
| 4,858,110 | 8/1989 | Miyata | 364/200 |
| 4,860,201 | 8/1989 | Stolfo et al. | 364/200 |
| 4,872,133 | 10/1989 | Leeland | 364/748 |
| 4,873,626 | 10/1989 | Gifford | 364/200 |
| 4,891,787 | 1/1990 | Gifford | 364/900 |
| 4,896,265 | 1/1990 | Fiduccia et al. | 364/200 |
| 4,901,224 | 2/1990 | Ewert | 364/200 |
| 4,903,260 | 2/1990 | Boettle et al. | 370/60 |
| 4,905,143 | 2/1990 | Takahashi et al. | 364/200 |
| 4,907,148 | 3/1990 | Morton | 364/200 |
| 4,910,665 | 3/1990 | Mattheyses et al. | 395/800 |
| 4,916,652 | 4/1990 | Schwarz | 364/748 |
| 4,916,657 | 4/1990 | Morton | 364/900 |
| 4,920,484 | 4/1990 | Ranade | 364/200 |
| 4,922,408 | 5/1990 | Davis et al. | 364/200 |
| 4,925,311 | 5/1990 | Neches et al. | 364/200 |
| 4,933,846 | 6/1990 | Humphrey et al. | 364/200 |
| 4,933,895 | 6/1990 | Grinberg et al. | 364/748 |
| 4,942,516 | 7/1990 | Hyatt | 364/200 |
| 4,942,517 | 7/1990 | Cok | 364/200 |
| 4,943,912 | 7/1990 | Aoyma et al. | 364/200 |
| 4,956,772 | 9/1990 | Neches | 364/200 |
| 4,958,273 | 9/1990 | Anderson et al. | 364/200 |
| 4,964,032 | 10/1990 | Smith | 364/200 |
| 4,967,340 | 10/1990 | Dawes | 364/200 |
| 4,975,834 | 12/1990 | Xu et al. | 364/200 |
| 4,985,832 | 1/1991 | Grondalski | 364/200 |
| 4,992,926 | 2/1991 | Janke et al. | 364/134 |
| 4,992,933 | 2/1991 | Taylor | 364/200 |
| 5,005,120 | 4/1991 | Ruetz | 364/200 |
| 5,006,978 | 4/1991 | Neches | 364/200 |
| 5,008,815 | 4/1991 | Hillis | 364/200 |
| 5,008,882 | 4/1991 | Peterson et al. | 370/94.3 |
| 5,010,477 | 4/1991 | Omoda et al. | 364/200 |
| 5,016,163 | 5/1991 | Jesshope et al. | 364/200 |
| 5,020,059 | 5/1991 | Gorin et al. | 371/11.3 |
| 5,021,945 | 6/1991 | Morrison et al. | 364/200 |
| 5,038,282 | 8/1991 | Gilbert et al. | 364/200 |
| 5,038,386 | 8/1991 | Li | 382/49 |
| 5,041,189 | 8/1991 | Tamitani | 364/200 |
| 5,041,971 | 8/1991 | Carvey et al. | 364/200 |
| 5,045,995 | 9/1991 | Levinthal et al. | 364/200 |
| 5,047,917 | 9/1991 | Athas et al. | 364/200 |
| 5,049,982 | 9/1991 | Lee et al. | 357/81 |
| 5,056,000 | 10/1991 | Chang | 395/375 |
| 5,072,217 | 12/1991 | Georgiou et al. | 340/825.79 |
| 5,113,523 | 5/1992 | Colley et al. | 395/800 |
| 5,121,498 | 6/1992 | Gilbert et al. | 395/700 |
| 5,136,582 | 8/1992 | Firoozmand | 370/85.1 |
| 5,142,540 | 8/1992 | Glasser | 371/40.1 |
| 5,146,608 | 9/1992 | Hillis | 395/800 |
| 5,165,023 | 11/1992 | Gifford | 395/325 |
| 5,170,482 | 12/1992 | Shu et al. | 395/800 |
| 5,170,484 | 12/1992 | Gorodalski | 395/800 |
| 5,173,947 | 12/1992 | Chande et al. | 382/41 |
| 5,175,862 | 12/1992 | Phelps et al. | 395/800 |
| 5,175,865 | 12/1992 | Hillis | 395/800 |
| 5,181,017 | 1/1993 | Frey, Jr. et al. | 340/825.02 |
| 5,187,801 | 2/1993 | Zenios et al. | 395/800 |
| 5,189,665 | 2/1993 | Niehaus et al. | 370/458.1 |
| 5,197,130 | 3/1993 | Chen et al. | 395/325 |
| 5,212,773 | 5/1993 | Hillis | 395/200 |
| 5,212,777 | 5/1993 | Gove et al. | 395/375 |
| 5,218,676 | 6/1993 | Ben-Ayed et al. | 395/200 |
| 5,218,709 | 6/1993 | Fijany et al. | 395/800 |
| 5,230,079 | 7/1993 | Grondalski | 395/800 |
| 5,239,629 | 8/1993 | Miller et al. | 395/325 |
| 5,239,654 | 8/1993 | Ing-Simmons et al. | 395/800 |
| 5,247,613 | 9/1993 | Bromley | 395/200 |
| 5,251,097 | 10/1993 | Simmons et al. | 361/687 |
| 5,253,359 | 10/1993 | Spix et al. | 395/575 |
| 5,265,124 | 11/1993 | Staab et al. | 375/3 |
| 5,280,474 | 1/1994 | Nickolls et al. | 370/60 |
| 5,297,260 | 3/1994 | Kametani | 395/325 |
| 5,355,508 | 10/1994 | Kan | 395/800 |
| 5,367,636 | 11/1994 | Colley et al. | 395/200 |

OTHER PUBLICATIONS

H.P. Bakoglu, "Second–Level Shared Cache Implementation For Multiprocessor Computers With a Common Interface For The Second–Level Shared Cache And The Second–Level Private Cache", IBM Technical Disclosure Bulletin, vol. 33, No. 11, pp. 362–365, Apr. 1991.

Mansingh et al., "System Level Air Flow Analysis for a Computer System Processing Unit", *Hewlett–Packard Journal*, vol. 41, No. 5, Oct. 1990, pp. 82–87.

Tewksbury et al., "Communication Network Issues and High–Density Interconnects in Large–Scale Distributed Computing Systems", *IEEE Journal on Selected Areas in Communication*, vol. 6 No. 3, Apr. 1988, pp. 587–607.

Boubekeur et al., "Configuring a Wafer–Scale Two–Dimensional Array of Single–Bit Processors", Computer, vol. 2, Issue 4, Apr. 1992, pp. 29–39.

Korpiharju et al., "TUTCA Configurable Logic Cell Array Architecture" IEEE, Sep. 1991, pp. 3–3.1–3–3.4.

C.K. Baru and S.Y.W. Su, "The Architecture of SM3: A Dynamically Partitionable Multicomputer System", IEEE Transactions on Computers, vol. C–35, No. 9, pp. 790–802, Sep. 1986.

S.P. Booth et al., "An Evaluation of the Meiko Computing Surface for HEP Fortran Farming*", Computer Physics Communications 57, pp. 486–491, 1989.

S.P. Booth et al., "Large–Scale Applications of Transputers in HEP: The Edinburgh Concurrent Supercomputer Project", Computer Physics Communications 57, pp. 101–107, 1989.

P. Christy, "Software to Support Massively Parallel Computing on the MasPar MP–1", 1990 IEEE, pp. 29–33.

S.R. Colley, "Parallel Solutions to Parallel Problems", Research & Development, pp. 42–45, Nov. 21, 1989.

J.R. Nickolls, "The Design of the MasPar MP-1: A Cost Effective Massively Parallel Computer", 1990 IEEE, pp. 25–28.

J.F. Prins and J.A. Smith, "Parallel Sorting of Large Arrays on the MasPar MP-1*, The 3rd Symposium on the Frontiers of Massively Parallel Computation", pp. 59–64, Oct., 1990.

J.B. Rosenberg and J.D. Becher, "Mapping Massive SIMD Parallelism onto Vector Architectures for Simulation", Software–Practice and Experience, vol. 19(8), pp. 739–756, Aug. 1989.

J.C. Tilton, "Porting an Interative Parallel Region Growing Algorithm from the MPP to the MasPar MP-1", The 3rd Symposium on the Frontiers of Massively Parallel Computation, pp. 170–173, Oct., 1990.

"Sequent Computer Systems Balance and Symmetry Series", Faulkner Technical Reports, Inc., pp. 1–6, Jan., 1988.

"Symmetry 2000/400 and 2000/700 with the DYNIX/ptx Operation System", Sequent Computer Systems Inc.

"Symmetry 2000 Systems—Foundation for Information Advantage", Sequent Computer Systems Inc.

"Our Customers Have Something That Gives Them an Unfair Advantage", The nCUBE Parallel Software Environment, nCUBE Corporation.

Y.M. Leung, "Parallel Technology Mapping With Identification of Cells for Dynamic Cell Generation", Dissertation, Syracuse University, May 1992.

"The Connection Machine CM-5 Technical Summary", Thinking Machines Corporation, Oct., 1991.

Fineberg et al., "Experimental Analysis of a Mixed–Mode Parallel Architecture Using Bitonic Sequence Sorting", *Journal of Parallel And Distributed Computing*, Mar. 1991, pp. 239–251.

T. Bridges, "The GPA Machine: A Generally Partitionable MSIMD Architecture", The 3rd Symposium on the Frontiers of Massively Parallel Computation, Oct. 1990, pp. 196–203.

Abreu et al., "The APx Accelerator", The 2nd Symposium on the Frontiers of Massively Parallel Computation, Oct. 1988, pp. 413–417.

D.A. Nicole, "Esprit Project 1085 Reconfigurable Transputer Processor Architecture", CONPAR 88 Additional Papers, Sep. 1988, pp. 12–39.

E. DeBenedictis and J.M. del Rosario, "nCUBE Parallel I/O Software", IPCCC '92, 1992 IEEE, pp. 0117–0124.

T.H. Dunigan, "Hypercube Clock Synchronization:. Concurrency: Practice and Experience", vol. 4(3), pp. 257–268, May 1992.

T.H. Dunigan, "Performance of the Intel iPSC/860 and Ncube 6400 hypercubes*", Parallel Computing 17, pp. 1285–1302, 1991.

D.D. Gajski and J.K. Peir, "Essential Issues in Multiprocessor Systems", 1985 IEEE, pp. 9–27, Jun. 1985.

A. Holman, "The Meiko Computing Surface: A Parallel & Scalable Open Systems Platform for Oracle", A Study of a Parallel Database Machine and its Performance—The NCR/Teradata DBC/1012, pp. 96–114.

Baba et al., "A Parallel Object–Oriented Total Architecture: A-NET", Proceedings Supercomputing, Nov. 1990, pp. 276–285.

Mitchell et al., "Architectural Description of a New, Easily Expandable Self–Routing Computer Network Topology", IEEE INFOCOM, Apr. 1989, pp. 981–988.

K. Padmanabhan, "Hierarchical Communication in Cube–Connected Multiprocessors", The 10th International Conference on Distributed Computing Systems, May 1990, pp. 270–277.

Fineberg et al., "Experimental Analysis of Communication/Data–Conditional Aspects of a Mixed–Mode Parallel Architecture via Synthetic Computations", *Proceeding Supercomputing '90*, Nov. 1990, pp. 647–646.

Kan et al., "Parallel Processing on the CAP: Cellular Array Processor", *COMPCON 84*, 16 Sep. 1984, pp. 239–244.

Ezzedine et al., "A 16–bit Specialized Processor Design", *Integration The VLSI Journal*, vol. 6 No. 1, May 1988, pp. 101–110.

A. Mudrow, "High Speed Scientific Arithemetic Using a High Performance Sequencer", *ELECTRO*, vol. 6, No. 11, 1986, pp. 1–5.

Alleyne et al., "A Bit–Parallel, Word–Parallel, Massively Parallel Accociative Processor for Scientific Computing", *Third Symposium on the Frontiers of Massive Parallel Computation*, Oct. 8–10, 1990; pp. 176–185.

Jesshope et al., "Design of SIMD Microprocessor Array", *IEEE Proceedings*, vol. 136., May 1989, pp. 197–204.

DeGroot et al., "Image Processing Using the Sprint Multiprocessor", *IEEE*, 1989, pp. 173–176.

Nudd et al., "An Heterogeneous M–SIMD Architecture for Kalman Filter Controlled Processing of Image Sequences", *IEEE* 1992, pp. 842–845.

Li et al., "Polmorphic–Torus Network", IEEE Transactions on Computers, vol. 38, No. 9, Sep. 1989 pp. 1345–1351.

Li et al., "Sparse Matrix Vector Multiplication of Polymorphic–Torus", IBM Technical Disclosure Bulletin, vol. 32, No. 3A, Aug. 1989, pp. 233–238.

Li et al., "Parallel Local Operator Engine and Fast P300", IBM Tech. Disc. Bulletin, vol. 32, No. 8B, Jan. 1990, pp. 295–300.

R. Duncan, "A Survey of Parallel Computer Architectures", IEEE, Feb. 90' pp. 5–16.

C.R. Jesshope et al., "Design of SIMD Microprocessor Array", UMI Article Clearing house, Nov. 88'.

Sener Ilgen & Isaac Schers, "Parallel Processing on VLSI Associative Memory", NSF Award #ECS–8404627, pp. 50–53.

H. Stone, "Introduction to Computer Architecture", Science Research Associates, 1975, Ch. 8, pp. 318–374.

R. M. Lea, "WASP: A WSI Associative String Processor" Journal of VLSI Signal Processing, May 1991, No. 4, pp. 271–285.

Lea, R. M., "ASP Modules: Cost-Effective Building–Blocks for Real–Time DSP Systems", Journal of VLSI Signal Processing, vol. 1, No. 1, Aug. 1989, pp. 69–84.

Isaac D. Scherson, et al., "Bit Parallel Arithmetic in a Massively–Parallel Associative Processor", IEEE, Vo. 41, No. 10, Oct. 1992.

Supreet Singh and Jia–Yuan Han, "Systolic arrays", IEEE, Feb. 1991.

H. Richter and G. Raupp, "Control of a Tokamak Fusion Esperiment by a Set of Multitop Parallel Computers", IEEE vol. 39, 1992, pp. 192–197.

Higuchi et al., "IXM2: A Parallel Associative Processor for Sematic Net Processing—Preliminary Evaluation—", IEEE, Jun. 1990, pp. 667–673.

Frison et al., "Designing Specific Systolic Arrays with the API15C Chip", IEEE 1990, xii+808pp., pp. 505–517.

Berg et al., "Instruction Execution Trade–Offs for SIMD vs. MIMD vs. Mixed Mode Parallelism", IEEE Feb. 1991, pp. 301–308.

Raghaven et al., "Fine Grain Parallel Processors and Real–Time Applications: MIMD Controller/SIMD Array", IEEE, May 1990, pp. 324–331.

G. J. Lipovski, "SIMD and MIMD Processing in the Texas Reconfigurable Array Computer", Feb. 1988, pp. 268–271.

R.M. Lea, "ASP: A Cost–effective Parallel Microcomputer", IEEE Oct. 1988, pp. 10–29.

Mark A. Nichols, "Data Management and Control–Flow Constructs in a SIMD/SPMD Parallel Language/Compiler", IEEE, Feb. 1990, pp. 397–406.

Will R. Moore, "VLSI For Artificial Intelligence", Kluwer Academic Publishers, Ch. 4.1.

Mosher et al., "A Software Architecture for Image Processing on a Medium–Grain Parallel Machine", SPIE vol. 1659 Image Processing and Interchange, 1992/279.

*Patent Abstracts of Japan,* vol. 8, No. 105, 17 May 1984, p. 274, App. No. JP–820 125 341 (Tokyo Shibaura Denki KK) 27 Jan. 1984.

W.D. Hillis, *"The Connection Machine",* The MIT Press, Chapters, 1, 3, and 4.

"Joho–syori", vol. 26(3), 1985–3, pp. 213–225, (Japanese).

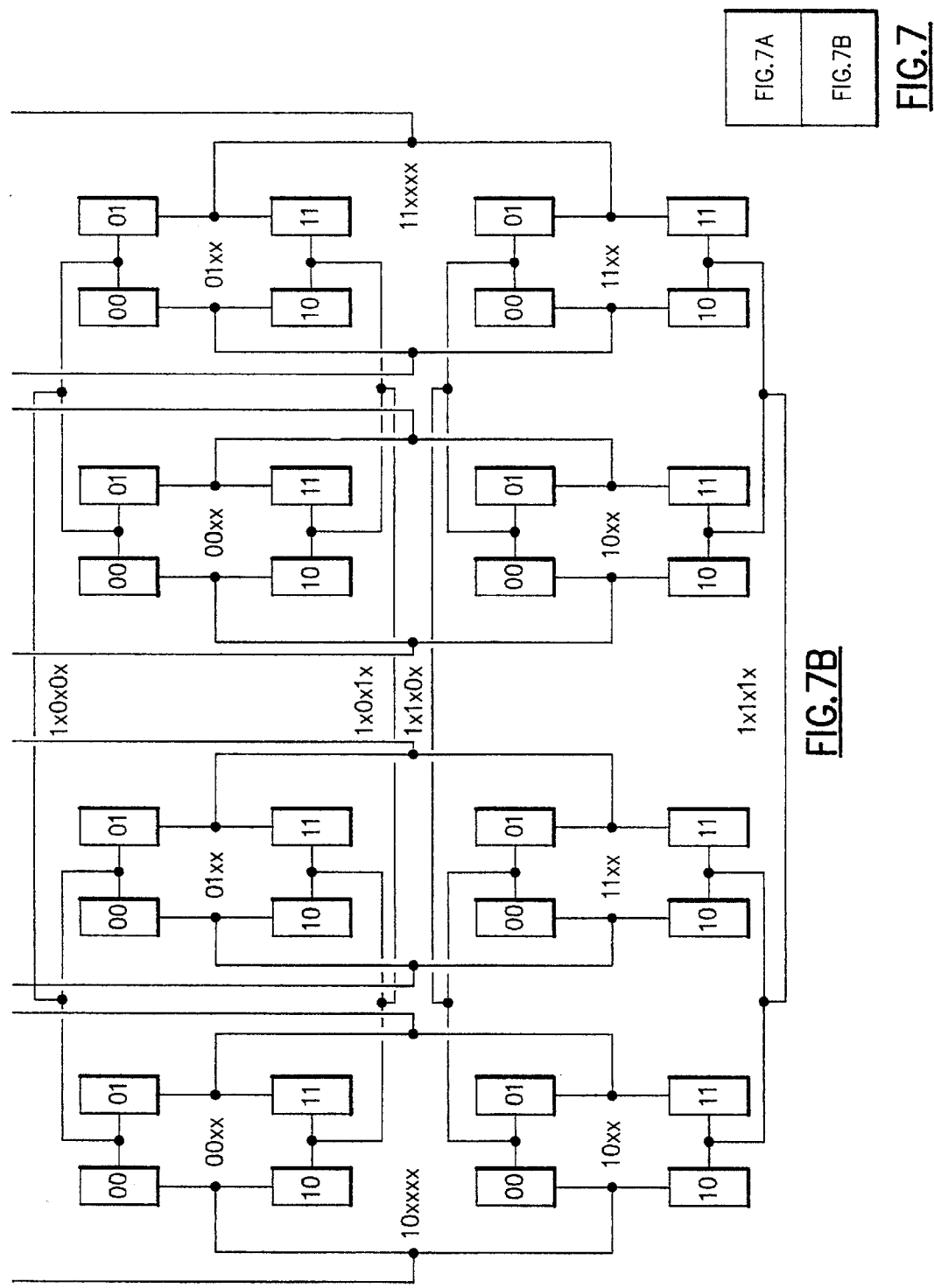

ARRAY PROCESSOR DOTTED COMMUNICATION NETWORK BASED ON H-DOTS

RELATED APPLICATIONS

This is a continuation of application Ser. No. 07/887,997, filed on May 22, 1992 now abandoned which is a continuation-in-part application Ser. No. 07/611/594 filed on Nov. 13, 1990 abandoned which is a continuation-in-part application Ser. No. 07/798,788 filed on Nov. 27, 1991 abandoned.

The present application claims priority and is a continuation-in-part of the following related patent applications:

U.S. patent application Ser. No. 611,594, filed Nov. 13, 1990, of J. Dieffenderfer et al., entitled "Parallel Associative Processor System" now abandoned; and U.S. patent application Ser. No. 798,788, filed Nov. 27, 1991, of P. M. Kogge, entitled "Dynamic Multi-Mode Parallel Processor Array Architecture" now abandoned.

In addition, this application is related to the following applications filed concurrently herewith:

U.S. patent application Ser. No. 07/887,718, filed May 22, 1992, of P. A. Wilkinson et al., entitled "Instructions within a SIMD Processing Element": and U.S. patent application Ser. No. 07/887,514, filed May 22, 1992, of P. A. Wilkinson et al., entitled "Floating Point Implementation on a SIMD Machine"; and U.S. patent application Ser. No. 07/887455, filed May 22, 1992, of P. A. Wilkinson et al., entitled "Grouping of SIMD Pickets"; and U.S. patent application Ser. No. 07/887,456, filed May 22, 1992, of P. A. Wilkinson et al., entitled "Slide Network for an Array Processor"; and U.S. patent application Ser. No. 07/887,256, filed May 22, 1992, of P. A. Wilkinson et al., entitled "Picket Autonomy on a SIMD Machine"; and U.S. patent application Ser. No. 07/887,459, filed May 22, 1992, now abandoned in favor of its continuation application Ser. No. 08/292,943, filed Aug. 18, 1994, of P. A. Wilkinson et al., entitled "A SIMD/MIMD parallel processor Array Controller".

Further this application is related to:

U.S. patent application Ser. No. 07/887,630, filed May 22, 1992, of T. Barker, et al., entitled "Advanced Parallel Array Processor", and U.S. patent application Ser. No. 07/888,000, filed May 22, 1992, of T. Barker, et al., entitled "SIMD/MIMD Processing Memory Element"; and U.S. patent application Ser. No. 07/993,255, filed Dec. 18, 1992, of T. Barker, et al., entitled "PME Store and Forward/Circuit Switched Modes"; and U.S. patent application Ser. No. 07/887,508, filed May 22, 1992, of T. Barker, et al., entitled "Fully Distributed Processing Memory Element"; and U.S. patent application Ser. No. 07/887,612, filed May 22, 1992, of M. Dapp, et al., entitled "Advanced Parallel Processor Array Director"; and U.S. patent application Ser. No. 07/887,512, filed May 22, 1992, of M. Dapp, et al., entitled "APAP Mechanical Packaging"; and U.S. patent application Ser. No. 07/887,684, filed May 22, 1992, of T. Barker, et al., entitled "N-Dimensional Modified Hypercube"; and U.S. patent application Ser. No. 07/887,258, filed May 22, 1992, of M. Dapp, et al., entitled "APAP I/O Programmable Router"; and U.S. patent application Ser. No. 07/887,259, filed May 22, 1992, of T. Barker, et al.. entitled "APAP I/O Zipper Connection"; and These co-pending applications and the present application are owned by one and the same assignee, International Business Machines Corporation of Armonk, N.Y.

The descriptions set forth in these co-pending applications are incorporated into the present application by reference.

CROSS REFERENCE TO OTHER CO-PENDING PATENT APPLICATIONS

Other commonly owned Co-Pending applications also assigned to the same assignee as the present application at the time of filing include:

U.S. patent application Ser. No. 07/250,595, filed Sep. 27, 1988, now abandoned in favor of its continuation application Ser. No. 07/519,332, filed May 4, 1990 of James L. Taylor entitled "SIMD Array Processor" (which was originally published as EPO application Ser. No. 88307855/88-A on May 3, 1989); and U.S. patent application Ser. No. 07/193,990, filed May 13, 1988, of H. Li, entitled "Methods and Circuit for Implementing an Arbitrary Graph on a Polymorphic Mesh"; and U.S. patent application Ser. No. 07/426,140, filed Oct. 24, 1989, of R. Jaffe et al entitled "Two-Dimensional Input/Output Scheme for Massively Parallel SIMD Computers"; and U.S. patent application Ser. No. 07/439,758, filed Nov. 21, 1989, of W. C. Dietrich, Jr. et al entitled "Method and Apparatus for Performing Memory Protection Operations in a Parallel Processor System"; and U.S. patent application Ser. No. 07/698,866, filed May 13, 1991, of David B. Rolfe, entitled "Method for Interconnecting and System of Interconnected Processing Elements".

All above referenced co-pending applications are also are owned by one and the same assignee, namely, International Business Machines Corporation of Armonk, N.Y.

The descriptions set forth in these co-pending applications are also incorporated by reference.

FIELD OF THE INVENTION

These inventions relate to computers and computer systems, particularly to arrays of processors and to their communication networks that interconnect SIMD, MIMD, and SIMIMD processing elements and provide the network for passing information throughout the array of processors.

GLOSSARY OF TERMS

ALU

ALU is the arithmetic logic unit portion of a processor.

Array

Array refers to an arrangement of elements in one or more dimensions. An array can include an ordered set of data items (array element) which in languages like Fortran are identified by a single name. In other languages such a name of an ordered set of data items refers to an ordered collection or set of data elements, all of which have identical attributes. A program array has dimensions specified, generally by a number or dimension attribute. The declarator of the array may also specify the size of each dimension of the array in some languages. In some languages, an array is an arrangement of elements in a table. In a hardware sense, an array is a collection of structures (functional elements) which are generally identical in a massively parallel architecture. Array elements in data parallel computing are elements which can be assigned operations and when parallel can each independently and in parallel execute the operations required. Generally, arrays may be thought of as grids of processing elements. Sections of the array may be assigned sectional data, so that sectional data can be moved around in a regular grid pattern. However, data can be indexed or assigned to an arbitrary location in an array.

Array Director

An Array Director is a unit programmed as a controller for an array. It performs the function of a master controller for a grouping of functional elements arranged in an array.

Array Processor

There two principal types of array processors - multiple instruction multiple data (MIMD) and single instruction multiple data (SIMD). In a MIMD array processor, each processing element in the array executes its own unique instruction stream with its own data. In a SIMD array processor, each processing element in the array is restricted to the same instruction via a common instruction stream; however, the data associated with each processing element is unique. Our preferred array processor has other characteristics. We call it Advanced Parallel Array Processor, and use the acronym APAP.

Asynchronous

Asynchronous is without a regular time relationship; the execution of a function is unpredictable with respect to the execution of other functions which occur without a regular or predictable time relationship to other function executions. In control situations, a controller will address a location to which control is passed when data is waiting for an idle element being addressed. This permits operations to remain in a sequence while they are out of time coincidence with any event.

BOPS/GOPS

BOPS or GOPS are acronyms having the same meaning—billions of operations per second. See GOPS.

Circuit Switched/Store Forward

These terms refer to two mechanisms for moving data packets through a network of nodes. Store Forward is a mechanism whereby a data packet is received by each intermediate node, stored into its memory, and then forwarded on towards its destination. Circuit Switch is a mechanism whereby an intermediate node is commanded to logically connect its input port to an output port such that data packets can pass directly through the node towards their destination, without entering the intermediate node's memory.

Cluster

A cluster is a station (or functional unit) which consists of a control unit (cluster controller) and the hardware (which may be terminals, functional units, or visual components) attached to it. Our Cluster includes an array of PMEs sometimes called a Node array. Usually a cluster has 512 PMEs.

Our Entire PME node array consists of a set of clusters, each cluster supported by a cluster controller (CC).

Cluster controller

A cluster controller is a device that controls input/output (I/O) operations for more than one device or functional unit connected to it. A cluster controller is usually controlled by a program stored and executed in the unit as it was in the IBM 3601 Finance Communication Controller, but it can be entirely controlled by hardware as it was in the IBM 3272 Control Unit.

Cluster synchronizer

A cluster synchronizer is a functional unit which manages the operations of all or pad of a cluster to maintain synchronous operation of the elements so that the functional units maintain a particular time relationship with the execution of a program.

Controller

A controller is a device that directs the transmission of data and instructions over the links of an interconnection network; its operation is controlled by a program executed by a processor to which the controller is connected or by a program executed within the device.

CMOS

CMOS is an acronym for Complementary Metal-Oxide Semiconductor technology. It is commonly used to manufacture dynamic random access memories (DRAMs). NMOS is another technology used to manufacture DRAMS. We prefer CMOS but the technology used to manufacture the APAP is not intended to limit the scope of the semiconductor technology which is employed.

Dotting

Dotting refers to the joining of three or more leads by physically connecting them together. Most backpanel busses share this connection approach. The term relates to OR DOTS of times past but is used here to identify multiple data sources that can be combined onto a bus by a very simple protocol.

Our I/O zipper concept can be used to implement the concept that the port into a node could be driven by the port out of a node or by data coming from the system bus. Conversely, data being put out of a node would be available to both the input to another node and to the system bus. Note that outputting data to both the system bus and another node is not done simultaneously but in different cycles.

Dotting is used in the H-DOT discussions where Two-ported PEs or PMEs or Pickets can be used in arrays of various organizations by taking advantage of dotting. Several topologies are discussed including 2D and 3D Meshes, Base 2 N-cube, Sparse Base 4 N-cube, and Sparse Base 8 N-cube.

DRAM

DRAM is an acronym for dynamic random access memory, the common storage used by computers for main memory. However, the term DRAM can be applied to use as a cache or as a memory which is not the main memory.

FLOATING-POINT

A floating-point number is expressed in two pads. There is a fixed point or fraction pad, and an exponent pad to some assumed radix or Base. The exponent indicates the actual placement of the decimal point. In the typical floating-point representation a real number 0.0001234 is represented as 0.1234-3, where 0.1234 is the fixed-point pad and −3 is the exponent. In this example, the floating-point radix or base is 10, where 10 represents the implicit fixed positive integer base, greater than unity, that is raised to the power explicitly denoted by the exponent in the floating-point representation or represented by the characteristic in the floating-point representation and then multiplied by the fixed-point pad to determine the real number represented. Numeric literals can be expressed in floating-point notation as well as real numbers.

FLOPS

This terms refers to floating-point instructions per second. Floating-point operations include ADD, SUB, MPY, DIV and often many others. Floating-point instructions per second parameter is often calculated using the add or multiply instructions and, in general, may be considered to have a 50/50 mix. An operation includes the generation of exponent, fraction and any required fraction normalization. We could address 32 or 48-bit floating-point formats (or longer but we have not counted them in the mix.) A floating-point operation when implemented with fixed point instructions (normal or RISC) requires multiple instructions. Some use a 10 to 1 ratio in figuring performance while some specific studies have shown a ratio of 6.25 more appropriate to use. Various architectures will have different ratios.

Functional unit

A functional unit is an entity of hardware, software, or both, capable of accomplishing a purpose.

Gbytes

Gbytes refers to a billion bytes. Gbytes/s would be a billion bytes per second.

GIGAFLOPS $(10)^{**}9$ floating-point instructions per second.

GOPS and PETAOPS

GOPS or BOPS, have the same meaning—billions of operations per second. PETAOPS means trillions of operations per second, a potential of the current machine. For our APAP machine they are just about the same as BIPs/GIPs meaning billions of instructions per second. In some machines an instruction can cause two or more operations (i.e. both an add and multiply) but we don't do that. Alternatively it could take many instructions to do an op. For example we use multiple instructions to perform 64 bit arithmetic. In counting ops however, we did not elect to count log ops. GOPS may be the preferred use to describe performance, but there is no consistency in usage that has been noted. One sees MIPs/MOPs then BIPs/BOPs and Mega FLO PS/Giga FLO PS/Tera FLOPS/PetaFlops.

ISA

ISA means the Instruction Set Architecture.

Link

A link is an element which may be physical or logical. A physical link is the physical connection for joining elements or units, while in computer programming a link is an instruction or address that passes control and parameters between separate portions of the program. In multisystems a link is the connection between two systems which may be specified by program code identifying the link which may be identified by a real or virtual address. Thus generally a link includes the physical medium, any protocol, and associated devices and programming; it is both logical and physical.

MFLOPS

MFLOPS means $(10)^{**}6$ floating-point instructions per second.

MIMD

MIMD is used to refer to a processor array architecture wherein each processor in the array has its own instruction stream, thus Multiple Instruction stream, to execute Multiple Data streams located one per processing element.

Module

A module is a program unit that is discrete and identifiable or a functional unit of hardware designed for use with other components. Also, a collection of PEs contained in a single electronic chip is called a module.

Node

Generally, a node is the junction of links. In a generic array of PEs, one PE can be a node. A node can also contain a collection of PEs called a module. In accordance with our invention a node is formed of an array of PMEs, and we refer to the set of PMEs as a node. Preferably a node is 8 PMEs.

Node array

A collection of modules made up of PMEs is sometimes referred to as a node array, is an array of nodes made up of modules. A node array is usually more than a few PMEs, but the term encompasses a plurality.

PDE

A PDE is a partial differential equation.

PDE relaxation solution process

PDE relaxation solution process is a way to solve a PDE (partial differential equation). Solving PDEs uses most of the super computing compute power in the known universe and can therefore be a good example of the relaxation process. There are many ways to solve the PDE equation and more than one of the numerical methods includes the relaxation process. For example, if a PDE is solved by finite element methods relaxation consumes the bulk of the computing time. Consider an example from the world of heat transfer. Given hot gas inside a chimney and a cold wind outside, how will the temperature gradient within the chimney bricks develop? By considering the bricks as tiny segments and writing an equation that says how heat flows between segments as a function of temperature differences then the heat transfer PDE has been converted into a finite element problem. If we then say all elements except those on the inside and outside are at room temperature while the boundary segments are at the hot gas and cold wind temperature, we have set up the problem to begin relaxation. The computer program then models time by updating the temperature variable in each segment based upon the amount of heat that flows into or out of the segment. It takes many cycles of processing all the segments in the model before the set of temperature variables across the chimney relaxes to represent actual temperature distribution that would occur in the physical chimney. If the objective was to model gas cooling in the chimney then the elements would have to extend to gas equations, and the boundary conditions on the inside would be linked to another finite element model, and the process continues. Note that the heat flow is dependent upon the temperature difference between the segment and its neighbors. It thus uses the inter-PE communication paths to distribute the temperature variables. It is this near neighbor communication pattern or characteristic that makes PDE relation very applicable to parallel computing.

PICKET

This is the element in an array of elements making up an array processor. It consists of: data flow (ALU REGS), memory, control, and the portion of the communication matrix associated with the element. The unit refers to a 1/nth of an array processor made up of parallel processor and memory elements with their control and portion of the array intercommunication mechanism. A picket is a form of processor memory element or PME. Our PME chip design processor logic can implement the picket logic described in related applications or have the logic for the array of processors formed as a node. The term PICKET is similar to the commonly used array term PE for processing element, and is an element of the processing array preferably comprised of a combined processing element and local memory for processing bit parallel bytes of information in a clock cycle. The preferred embodiment consisting of a byte wide data flow processor, 32k bytes or more of memory, primitive controls and ties to communications with other pickets.

The term "picket" comes from Tom Sawyer and his white fence, although it will also be understood functionally that a military picket line analogy fits quite well.

Picket Chip

A picket chip contains a plurality of pickets on a single silicon chip.

Picket Processor system (or Subsystem)

A picket processor is a total system consisting of an array of pickets, a communication network, an I/O system, and a SIMD controller consisting of a microprocessor, a canned routine processor, and a micro-controller that runs the array.

Picket Architecture

The Picket Architecture is the preferred embodiment for the SIMD architecture with features that accommodate several diverse kinds of problems including:

set associative processing parallel numerically intensive processing physical array processing similar to images Picket Array A picket array is a collection of pickets arranged in a geometric order, a regular array.

PME or processor memory element

PME is used for a processor memory element. We use the term PME to refer to a single processor, memory and I/O capable system element or unit that forms one of our parallel array processors. A processor memory element is a term which encompasses a picket. A processor memory element is 1/nth of a processor array which comprises a processor, its associated memory, control interface, and a portion of an array communication network mechanism. This element can have a processor memory element with a connectivity of a regular array, as in a picket processor, or as pad of a subarray, as in the multi-processor memory element node we have described.

Routing

Routing is the assignment of a physical path by which a message will reach its destination. Routing assignments have a source or origin and a destination. These elements or addresses have a temporary relationship or affinity. Often, message routing is based upon a key which is obtained by reference to a table of assignments. In a network, a destination is any station or network addressable unit addressed as the destination of information transmitted by a path control address that identifies the link. The destination field identifies the destination with a message header destination code.

SIMD

A processor array architecture wherein all processors in the array are commanded from a Single Instruction stream to execute Multiple Data streams located one per processing element.

SIMDMIMD or SIMD/MIMD

SIMDMIMD or SIMD/MIMD is a term referring to a machine that has a dual function that can switch from MIMD to SIMD for a period of time to handle some complex instruction, and thus has two modes. The Thinking Machines, Inc. Connection Machine model CM-2 when placed as a front end or back end of a MIMD machine permitted programmers to operate different modes for execution of different pads of a problem, referred to sometimes a dual modes. These machines have existed since Illiac and have employed a bus that interconnects the master CPU with other processors. The master control processor would have the capability of interrupting the processing of other CPUs. The other CPUs could run independent program code. During an interruption, some provision must be made for checkpointing (closing and saving current status of the controlled processors).

SIMIMD

SIMIMD is a processor array architecture wherein all processors in the array are commanded from a Single Instruction stream, to execute Multiple Data streams located one per processing element. Within this construct, data dependent operations within each picket that mimic instruction execution are controlled by the SIMD instruction stream.

This is a Single Instruction Stream machine with the ability to sequence Multiple Instruction streams (one per Picket) using the SIMD instruction stream and operate on Multiple Data Streams (one per Picket). SIMIMD can be executed by a processor memory element system.

SISD

SISD is an acronym for Single Instruction Single Data.

Swapping

Swapping interchanges the data content of a storage area with that of another area of storage.

Synchronous Operation

Synchronous operation in a MIMD machine is a mode of operation in which each action is related to an event (usually a clock); it can be a specified event that occurs regularly in a program sequence. An operation is dispatched to a number of PEs who then go off to independently perform the function. Control is not returned to the controller until the operation is completed.

If the request is to an array of functional units, the request is generated by a controller to elements in the array which must complete their operation before control is returned to the controller.

TERAFLOPS

TERAFLOPS means $(10)^{**}12$ floating-point instructions per second.

VLSI

VLSI is an acronym for very large scale integration (as applied to integrated circuits).

Zipper

A zipper is a new function provided. It allows for links to be made from devices which are external to the normal interconnection of an array configuration.

BACKGROUND OF THE INVENTION

In the never ending quest for faster computers, engineers are linking hundreds, and even thousands of low cost microprocessors together in parallel to create super supercomputers that divide in order to conquer complex problems that stump today's machines. Such machines are called massively parallel. We have created a new way to create massively parallel systems. The many improvements which we have made should be considered against the background of many works of others. A summary of the field has been made in other applications which are referenced. See in this connection the related application for our Parallel Associative Processor System, U.S. Ser. No. 601,594 and our Advanced Parallel Array Processor (APAP). System tradeoffs are required to pick the architecture which best suits a particular application but no single solution has been satisfactory. Our ideas make it easier to provide a solution.

The interrelationship of the processors in an array of processors and the methods used to communicate among the processors has been the focus of considerable study as documented in the literature related to such arrays. Studies have focused on minimizing the number of steps to move a message between any two elements of the array, Studies have focused on nearby communication to support image processing and other such very regular problems. In short, A parallel processor array of the SIMD or MIMD type requires a highly organized and efficient connection network for communication among processing elements (PEs).

A communication network can be required to communicate synchronously where all pickets transfer data in the same direction at the same time, or it can be required to communicate randomly as where each picket sends out a message at random times to random places. This later approach we call a routed transfer.

Synchronous transfers and router transfers may need to be addressed on either a MIMD or a SIMD array control architecture while attempting to keep the communication complexity simple.

Several communication topologies are described in the literature and implemented in various ways is array machines. A basic communication topology is the simple left-right connectivity of a linear array. In a linear array each of the two port PEs communicate with the PE on either the left of the right via a point to point network. In a more extensive conventional mesh topology of two or more dimensions, the communication network is implemented by using direct links between a source element and the elements in each of the implemented dimensions. Thus, each element has two links for each dimension of the array as where in a conventional two dimensional array with NEWS (north, east, west, south) network, each element will have four links to other elements, and if another dimension is added, two more links must be added to each element of the mesh. Within each element of a conventional mesh there may be a router function that receives and transmits messages or data packets over the appropriate links. The Hypercube in several of it's multibased multidimensional embodiments represents something near the ultimate in processor array communication networks. With the binary hypercube, for example, the number of ports quickly grows to significant proportions.

The processing element (PE) in a conventional array requires enough ports to reach the necessary elements with point to point network links. Some PEs need four ports, some 6, some 8, and some 30 (15 dimensional binary hypercube with 32k elements), depending on topology and extent of the implemented network. Also, each link can contain from one up to possibly 50 parallel lines to accommodate the ever increasing data transfer rate demands.

Now, as we are putting these topologies into hardware, the packaging of these arrays into chips, cards, drawers, racks, and rooms causes us to quickly focus on the number of links and the number of signal pins in each link. As wafer technology allows more circuits per chip, arrays of parallel processors are becoming more affordable, and more dense arrays are desired.

This application focuses on using DOTable networks to interconnect two port PEs to realize many of the topologies of today while significantly reducing packaging pincounts. The packaging of an array of pickets with any mesh configuration poses several packaging problems, most of which relate to limited available package pins, or the desire to minimize the number of pins required.

In the patent art there are some patents which generally talk about SIMD and other networks. Among them are U.S. Pat. No. 4,270,170 of Reddaway, entitled "Array Processor", which discusses a NEWS network connected SIMD array wherein a dotted three branch network is used to interconnect chips containing 4 PE each. Simultaneous transfer in one of the directions is accommodated. By using the dotted networks, the ports on one chip are reduced from 8 to 6 thereby achieving a 25% reduction in pin count. Only a 2D network is mentioned. A global routing scheme is directed by two lines which reach all elements in the array and encode the 4 directions common to a NEWS network. While this patent is representative of a prior dotted network to reduce pin and port count through out the network, it can not address four branches on each network but only three, and it provides more than three ports per processing element (3.5 on the average), leading to higher pin and port counts than we have found could be achieved. This patent only addresses a 2D NEWS network. We show it is desirable to accommodate extension into other dimensions and configurations and these problems are not addressed by this patent. Apparently, the array of this patent requires simultaneous transfer of data in a specified direction.

U.S. Pat. No. 4,468,727 of Carrison, entitled "Integrated Cellular Array Parallel Processor", discusses an array processor that is integrated with an array of radiation sensors such that image processing is performed on the same monolithic substrate with the sensors. Interconnection between the processing elements is accomplished with charge coupled gates on the NEWS edges of each PE, and as such represents just one of many NEWS arrays. It has no dotted communication network.

U.S. Pat. No. 4,805,091 of Thiel, entitled "Method and Apparatus for Interconnecting Processors in a Hyper-Dimensional Array", on the other hand, is a good example of the hypercube interconnection network employed by the machines made by Thinking Machines, Inc., e.g. a "Connection Machine", and it discusses the application of the binary hypercube to the packaging of PEs with chips, cards, boards, and frames where each level of package is accomplished with a higher (or lower) dimension of the hypercube. While this U.S. Pat. No. 4,805,091 patent does not mention any form of DOTing mechanism, it describes the binary hypercube. This is another example of the applicability of our invention of a dotted communication network for array processors, as our invention can be applied to implement a binary hypercube. The patent however, makes no mention of dotted buses as we will illustrate.

U.S. Pat. No. 4,985,832 of Grondalski, entitled "SIMD Array Processing System with Routing Networks Having a Plurality of Switching Stages to Transfer Messages Among Processors", is another example of SIMD Array Processing Systems having routing networks. They address small groups of PEs that communicate via memory sharing; a NEWS mesh providing for regular array processing; a mechanism whereby PEs can share a large broadcast communication task; and a random routing network comprised of some "butterfly" stages followed by a 16×16 crossbar switch; but this patent focuses on random routing including a crossbar switch chip and its fault tolerant aspects. While this patent focuses on a number of communication schemes, it does not describe any dotted mechanism.

U.S. Pat. No. 4,910,665 of Mattheyses, entitled "Distributed Processing System Including Reconfigurable Elements", discusses a two dimensional SIMD array processor interconnection scheme whereby each PE has direct access to 8 of its neighbors. The communication media is a dotted network that interconnects four neighbors at the corners. Each PE enjoys four such dotted networks each. The suggestion of the X-DOT of this U.S. Pat. No. 4,910,665 patent and the dotted connection that we call an H-DOT both permit four PEs to be joined together by a dotted network. However, U.S. Pat. No. 4,910,665 discusses only the mesh topology and extensions into toroids, and focuses on the circuit within a PE. We believe there needs to be improvements in the focus on the connectivity, and routing.

SUMMARY OF THE INVENTIONS

The improvements which we have made achieve a dotted network structure (H-DOT). H-DOT reduces the magnitude of the networking implementation. Our preferred embodiment applies to several topologies. Furthermore, with H-DOT connecting processing elements in a array, the array of processors can generally be extended in size and in additional dimensions while retaining a basic two port array processing element. Both synchronous and routed transfer control can be included, and we will discuss our routing algorithms.

As new machines with parallel arrays and multi-byte word transfers can now be obtained on a chip, pin count becomes a serious problem as mesh communication paths become more parallel. The present invention can be used to connect microcomputers with parallel communication paths.

Our H-DOT concept fits in here quite well, because it enables parallel communication with various topologies. The H-DOT concept is an approach for applying a processing element with two ports (or more in some cases) to a variety of interconnection topologies. Pin count can be significantly reduced, while the basic elements retain only two port devices. A result of our approach is the ability to extend a mesh to additional dimensions with the same two port element concept. In our preferred embodiment, we limit each PE to exactly two ports regardless of the desired configuration. So each PE (or picket) attaches to exactly two nets.

We provide that each net may extend to several other pickets, and in multiple dimensions.

Pin count is reduced, and our routing algorithm which is mechanized takes advantage of the above features. The routing algorithm that handles a message after it has been received is brutally simple. Either keep the message if it is mine, or pass it out the other port if it is not.

Among the advantages of the H-DOT approach are:
reduced pins;
simplified router algorithms;
lower transient time through a network;
potentially fewer hops;
higher signal utilization in a lightly loaded system;
ability to be configured into standard nets; and
significant fault tolerance capability with alternate routings.

We have created a new way to make massively parallel processors and other computer systems by creating a new "chip" and systems designed with our new concepts. This application is directed to such systems. Our here and in the related applications may be viewed of our expression of the various concepts we teach in this application, and in the related applications. Components described in each application can be combined in our systems to make new systems. They also can be combined with existing technology.

We will elaborate in this and related applications Picket Processors and what we call an Advanced Parallel Array Processor (APAP). It may be interesting to note that the picket processor can employ a PME. A picket processor may be especially useful in military application where a very compact array processor is desirable. In this connection, a picket processor differs somewhat from the preferred embodiment associated with the APAP, our Advanced Parallel Array Processor. However, the commonality exists, and aspects and features which we have provided can be employed in differing machines.

The term picket refers to 1/nth element of an array processor made up of processor and memory and their included communication elements applicable for array intercommunication.

The picket concept is also applicable to the 1/nth of an APAP processing array.

While the picket concept can differ from an APAP in data width, memory size, and number of registers, it is, in the massively parallel embodiment which is an alternative to an APAP, different in that it is configured to have connectivity for 1/nth of a regular array, while a PME in an APAP is a part of a sub-array. Both systems can execute SIMIMD. However, because a picket processor is configured as a SIMD machine with MIMD in the PE, it can directly execute SIMIMD, while a MIMD APAP configuration would execute SIMIMD by using MIMD PEs controlled to emulate SIMD. Both machines use a PME.

Both systems can be configured as a parallel array processor, comprising an array processing unit for the array having 'N' elements interconnected with an array communication network wherein 1/Nth of the processor array is a processing element, it's associated memory, a control bus interface, and a portion of the array communication network.

The parallel array processor has a dual operation mode capability wherein the processing unit can be commanded to operate in either or two modes, and freely move between these two modes for SIMD and MIMD operation, where when SIMD is the mode of its organization a processing unit has the ability to command each element to execute it's own instructions in a SIMIMD mode, and where when MIMD is the implementation mode for the processing units organization it has the ability to synchronize selected elements of the array to simulate MIMD execution. We can call this MIMD-SIMD).

A parallel array processor in both systems provides an array communication network with paths for the passing of information between elements of the array. The movement of information can be direction by either of two ways, where as a first way, an array controller directs that all messages move in the same direction at the same time such that the data being moved does not define its destination, and in a second way, each message is self routed with a header at the beginning of a message defining its destination. A segment of the parallel array processor array has plural copies of the processing unit provided on a single semiconductor chip, which each copy segment of the array including a portion of the array communication network associated with that segment and buffers, drivers, multiplexers, and control for enabling the segment portion of the array to be seamlessly connected with other segments of the array to extend the array communication network.

The control bus or path from a controller is provided for each processing unit so that the control bus extends to each of the elements of the array and controls its activities.

Each processing element segment of the parallel array, contains plural copies of a processor memory element, which is contained within the limits of a single semiconductor chip, has a segment of the array includes a portion of the array control bus and the register buffers to support the communication of controls to the array segment contained within the chip.

Both can implement mesh moves or routed moves. Normally, the APAP implements a dual interconnect structure, with eight elements on the chip interrelating in one way, while the chips interrelate in another way. The programmable routing on the chip generally causes links to be established between the PMEs as we have described, but the nodes can be and normally are related in another way. On the chip essentially the normal APAP configuration would be a 2×4 mesh, which the node interconnection can be a routed sparse octal N-cube. Both systems have inter-PE intercommunication pathways between PEs (PMEs) enabling a matrix to be made up of point-to-point paths.

With this background and perspective, we will describe in detail features and aspects of our invention related to the preferred embodiment of our invention with reference to the FIGURES.

BRIEF DESCRIPTION OF THE DRAWINGS

FIGS. 7A–7B show implementation of a 6 dimensional binary n-cube using H-DOT connection techniques. Note that the PEs are now 2 port instead of the 6 port PEs used in a conventional n-cube implementation.

FIG. 13 shows a block diagram of a parallel array processor we have described with a 2-D H-dot array, while

DETAILED DISCUSSION OF H-DOT

Our detailed description explains the preferred embodiments of our invention, together with advantages and features, with reference to the above drawings.

Figure 1:
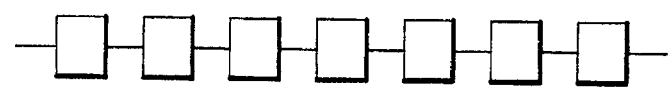
FIG. 1 shows a conventional linear array that makes natural use of two port processing elements (PEs).

A basic communication topology that can be used to pass data from PE to PE is the simple left-right connectivity of a linear array as pictured in FIG. 1 representing a conventional prior art linear array. Each of the two port PEs 10–22 communicates with the PE on either the left or the right via one of the point-to-point networks 11–21. This basic idea of a two port PE is fundamental to the discussion of our H-DOT structure.

Figure 2:
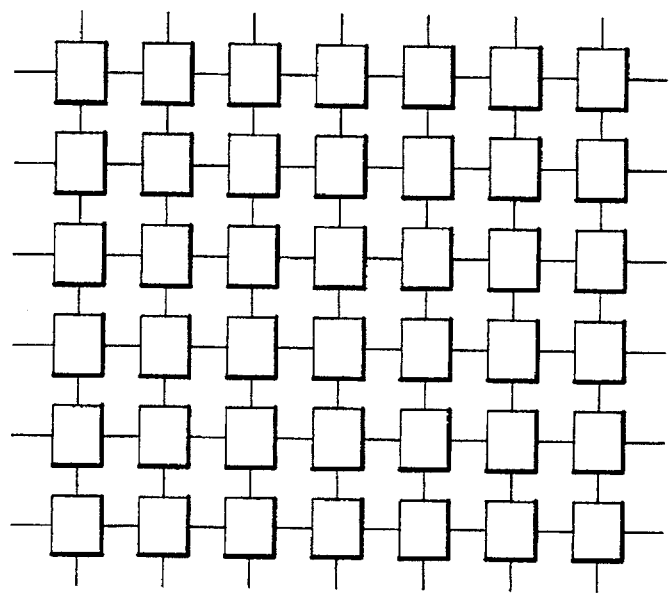
FIG. 2 shows a conventionally connected NEWS network with a point-to-point link to each of four neighboring PEs.

In the more extensive conventional mesh topology, the communication network is implemented using direct links between a source element and a destination element. Thus, each element has two links for each dimension of the array. For example, in a conventional two dimensional array with NEWS (north, east, west, south) communication, each element will have four links to other elements as shown in FIG. 2. If another dimension is added, two more links must be added to each element of the mesh. Within each element of a conventional mesh is a router function that receives and transmits messages or data packets over the appropriate links.

The communication network can be required to communicate synchronously where all pickets transfer data in the same direction at the same time, or it can be required to communicate randomly where each picket sends out a message at random times to random places. This later approach we call a routed transfer. Both of these kinds of communication may need to be addressed on either a MIMD or a SIMD array control architecture while attempting to keep the communication complexity simple.

Each link can contain from 1 up to possibly 50 parallel lines to accommodate the ever increasing data transfer rate demands.

The packaging of an array of pickets with any mesh configuration poses several packaging problems, most of which relate to limited available package pins, or to a desire to minimize the number of pins required.

The Parallel Associative Processor System, referenced above as a related application, has been described in the parent application with emphasis on a linear left/right communication mesh. There are, however, several interconnection meshes to consider. Some of these are:

| | |
|---|---|
| L/R Mesh | NEWS Mesh |
| Slide Bus | Shuffle Network |
| Simple Crossbar | Base 2 N-cube |
| Slide Crossbar | Base 8 N-cube |

We will discuss how to implement several of these array interconnection topologies using the H-dot idea to significantly reduce port and pin count in a given topology.

APPROACH—H-DOT

Control of mesh communications can be classified in two categories. If the communication is regular, some form of global control will tell all the pickets to do the same thing. This can be simultaneous or phased in some way. This type of communication is generally associated with SIMD control organizations; however, it works equally well with a MIMD organized array.

Figure 3:
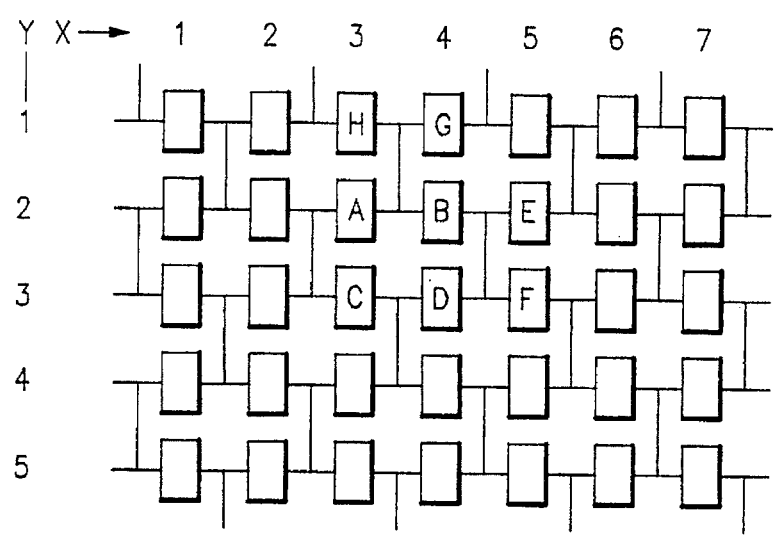
FIG. 3 shows implementation of the NEWS network using H-DOT connection techniques. Note that the PEs are now 2 port instead of 4 port.

Our preferred embodiment, H-DOT, can implement one of several mesh configurations all based on the same basic two port element. H-DOT takes two or more point-to-point links and combines their function into one network with attachments to more than two PEs. In implementing a 2D mesh using H-DOT interconnects (FIG. 3), for example, two adjacent N-S links (e.g., link H-to-A and link G-to-B) and two adjacent E-W links (e.g., link H-to-G and link A-to-B) are joined into one network 50 with attachments to 4 PEs (i.e., PEs H, G, B and A). If one is counting, this 4 port network 50 of the H-DOT interconnected 2D mesh of FIG. 3 replaces 4 two-port links 30–34 required by the prior art 2D mesh of FIG. 2, and thereby reduces the pin count by 50%. Also, it can be seen, because the N-S links (i.e., link H-to-A and link G-to-B) share the same wire of network 50, an array wide synchronous transfer will require 2 cycles. One of the cycles can be for the even PEs and the other cycle can be for the odd PEs. With H-DOT the interconnection of processing elements is dot-OR as illustrated in FIG. 3, such that a PE can interconnect to a next PE by a link that provides two vertical paths and two horizontal paths to the link, an apparent H connection link. A square processing element in our preferred embodiment is more than one processing element, and alternatively is a picket or a chip with eight or sixteen pickets. In this connection, reference should be made to the related application for additional details of our preferred processing element. However, as to this application, our square can represent a conventional microcomputer.

While we have above summarized advantages of the H-DOT approach, as with most things, there are drawbacks. Listed here are some effects of the H-DOT concept which in some environments will have a minor impact, but in other applications these effects could be significant. These effects are:

1. In synchronous transfers, where all elements pass data in the same direction at the same time, the H-DOT implementations require 2 clocks (or cycles) where conventional implementation requires one.
2. When routed transfers are being implemented, the H-DOT approach will introduce temporary blocking that could be important when communication traffic is heavy. The result is longer transfer time, not missed messages altogether.

If communication is of the random type, each message carries a destination address, and passes through the network with possible stops at intermediate nodes. Thus, each element must implement some form of routing algorithm. The router can be independent of the parallel processor control organization, or can be integrated with it.

With a two port element, not much of an algorithm is needed to decide what to do with a message that has been received by the element. The message either belongs to the element or is transferred out the other side. This algorithm is universal for all forms of mesh implemented with two port pickets or PEs.

There is another algorithm that determines whether to accept a message that is available at a port. In a two dimensional NEWS network, there are four ports that have access to a message, but only one can actually receive the message. The algorithm to decide to receive a message is based on getting the message to its destination while avoiding non-functional paths. The accept algorithm is based on the configuration of the array and will be discussed with the specific arrays.

Now we will detail more about H-DOT for the following mesh topologies.

North South East West (NEWS) mesh;
3 D mesh:
binary N-Cube:
Base 4 N-Cube; and
Octal N-Cube.

THREE-D NEWS ARRAY

This first description uses the basic 2 port picket that is used in the previously discussed East West slide bus shown in FIG. 1 to achieve a 2 dimensional NEWS array.

H-DOT, in concept, uses a wire dot-OR to connect a port from 4 (or more). different pickets. Another dot-OR connects the other port of one of the pickets to three (or more) other pickets. FIG. 3 shows the basic H-DOT pattern for a 2 dimensional mesh.

One of the advantages of the H-DOT approach is that the number of pins on each element is reduced by ½, and the number of links in various parts a 2D mesh are reduced by more than ½ as compared to what is needed with a conventional 2D (four port) mesh. A quick look at FIG. 3 shows that a single H-DOT link is providing two vertical paths and two horizontal paths.

Figure 4:
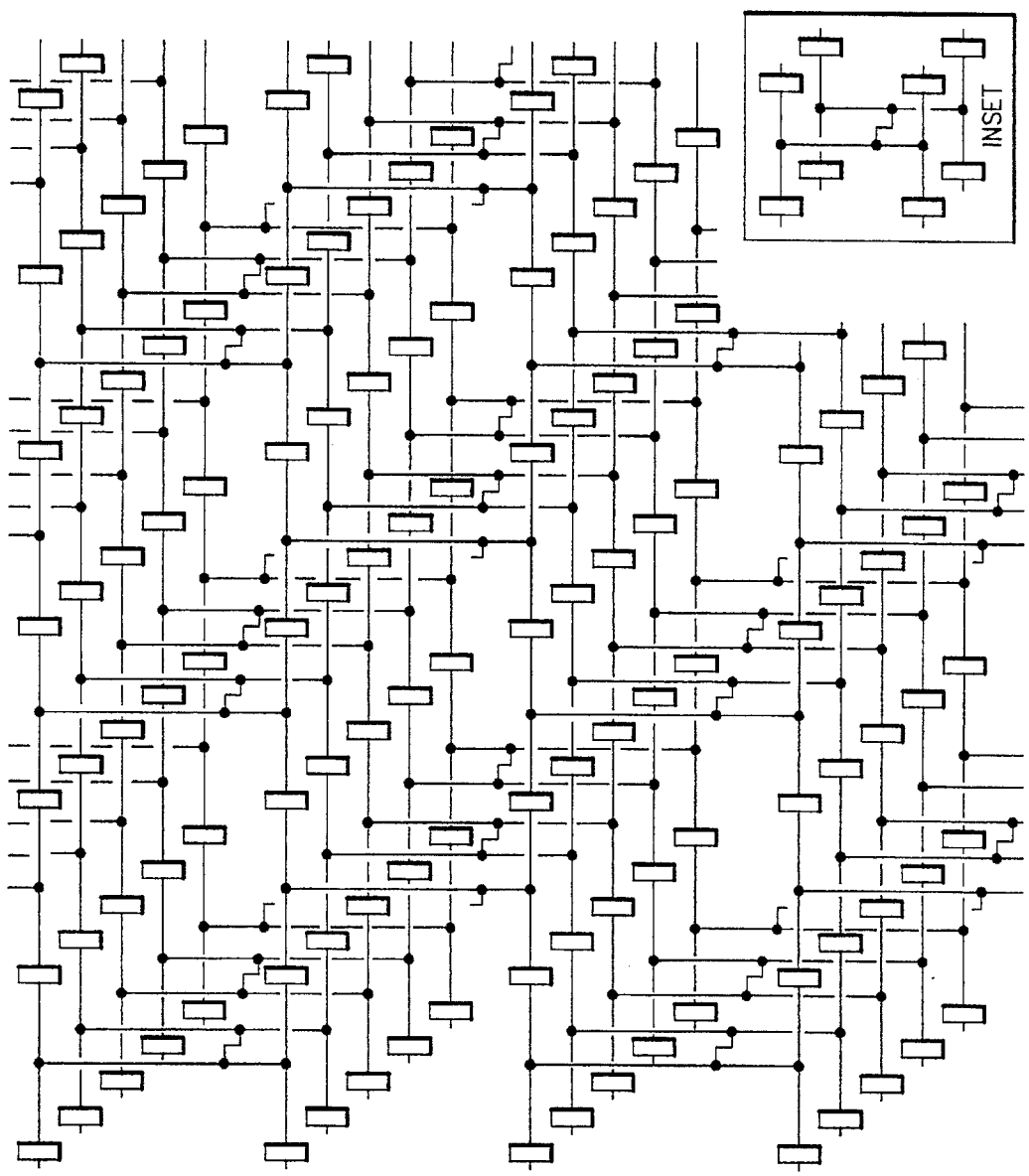
FIG. 4 shows implementation of a 3 dimensional mesh using H-DOT connection techniques. Note that the PEs are now 2 port instead of the conventional 6 port PEs used in conventional 3D mesh arrays.

Another advantage of the H-DOT approach is extensibility. We can go from the 2-D mesh just shown to a three dimensional mesh by implementing a double H-DOT as shown in FIG. 4. Here, four elements of the 3-D array are connected with a DOT network that looks like a Double-H with one H on top of the other. The inset of FIG. 4 shows one double H-DOT for clarity. In the bigger FIG. 4, these double H-DOTs are staggered in each dimension so that each PE has connection to each neighbor in each direction, and to maintain the double H-DOT connection integrity.

Communication over the H-DOT takes more communication cycles than with point-to-point links. The 2D H-DOT takes one or two cycles for each picket to send data to the picket on a specified side. Also, the double H forms 4 paths in each dimension, and thus, takes four cycles for all pickets to send data to the picket in a specified direction.

ROUTING ALGORITHM

The NEWS network is designed to be used for image and other regularly arranged data processing. In this case, the array controller tells all elements to simultaneously pass data to the elements on the same side.

A NEWS network can also be used for random communication. In this case, each element must have a router with a routing algorithm for initiating, receiving, and passing on messages. With the H-DOT approach, an element must decide to accept a message from an active port. Referring to FIG. 3, if element A sees a message from the left port, it accepts it if the destination address is:

its own address (Xd=Xo, Yd=Yo)
-OR-
in the upper right quadrant of the mesh
i.e.. the destination X address is=>than own address
or, the destination Y address is=<that own address Notice that there are 4 different algorithms depending on whether an element is in position A, B, C, or D.

BINARY HYPERCUBE

The next topology for discussion uses H-DOT to implement the binary hypercube.

Figure 5:
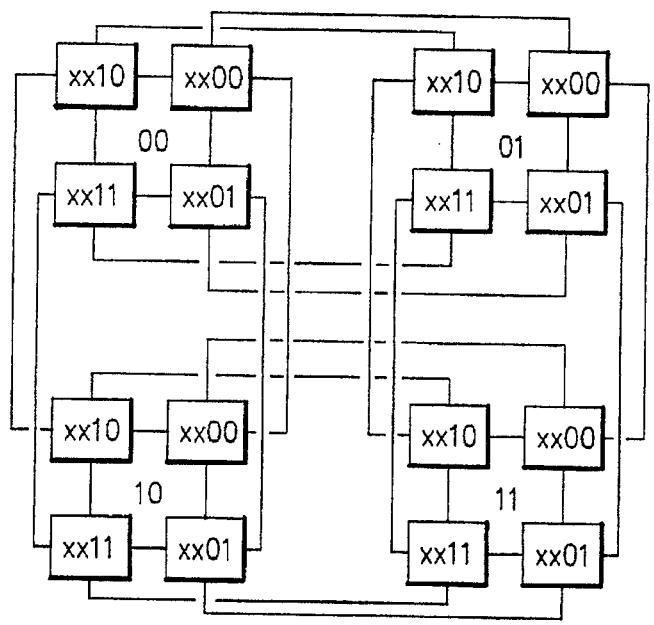
FIG. 5 shows a conventional binary N-Cube of 4 dimensions implemented with 4 port PEs.

FIG. 5, shows a typical binary hypercube of 4 dimensions. Each element of the cube has one connection for each dimension. Because each dimension only has two values, an array of significant size has a lot of dimensions. A 4 d cube has 16 elements with 4 ports each. An array with 1024 elements is a 10 d binary cube with 10 ports on each element.

Figure 6:
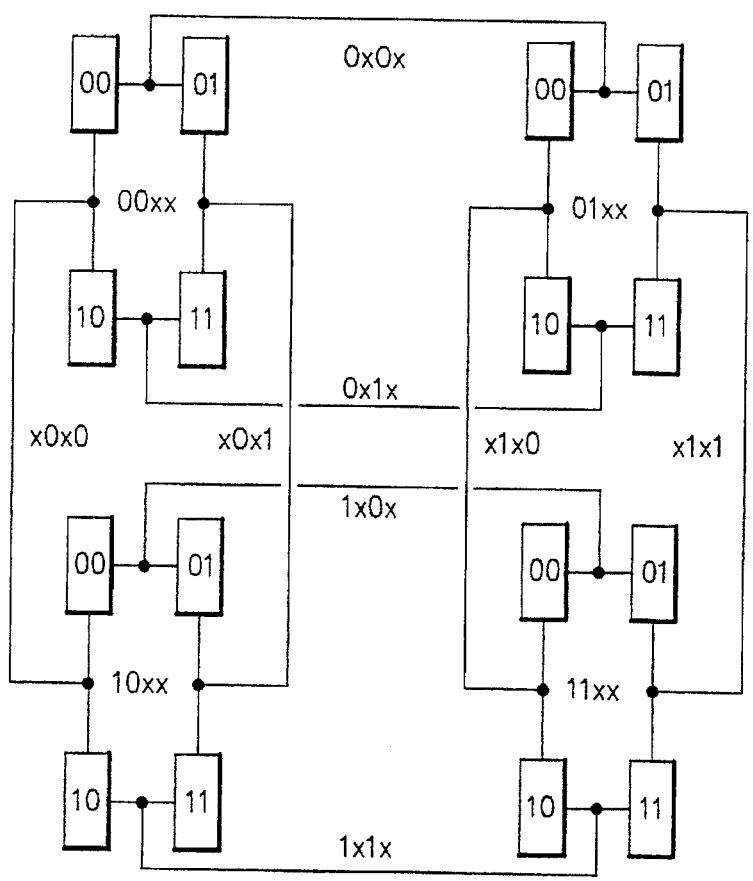
FIG. 6 shows implementation of a 4 dimensional binary n-cube using H-DOT connection techniques. Note that the PEs are now 2 port instead of the 4 port PEs shown in FIG. 5.

When the binary n-cube is implemented in H-DOT, a 4 dimension version would look like FIG. 6. Each element has two ports and is connected with dot-OR buses, in the characteristic H-DOT configuration (a little bent), to its communication partners.

The H-DOT, while limiting the number of ports per element to two and significantly reducing the pin count over conventional implementations, has increased the number of destination options that a message can reach in one move. For example, in a conventional n-cube, element 0000 can communicate on four links to these addressable processing elements: 0001, 0010, 0100, and 1000 in one move. With the H-DOT implementation, element 0000 can communicate on two links to elements: 0001, 0100, 0101, 0010, 1000, and 1010 in one move. On a 4 dimensional binary cube implemented in H-DOT, the average number of moves per message could be reduced by 25% over a conventional binary cube with low message densities if these additional connections were used. In a way, this H-DOT implementation of the binary n-cube results in something that is no longer just a binary n-cube. The definition of a binary n-cube states that a PE has connection to other PEs whose address differs by 1 bit from this PE. In any case, it is more and not less than a binary n-cube.

Figure 7A:
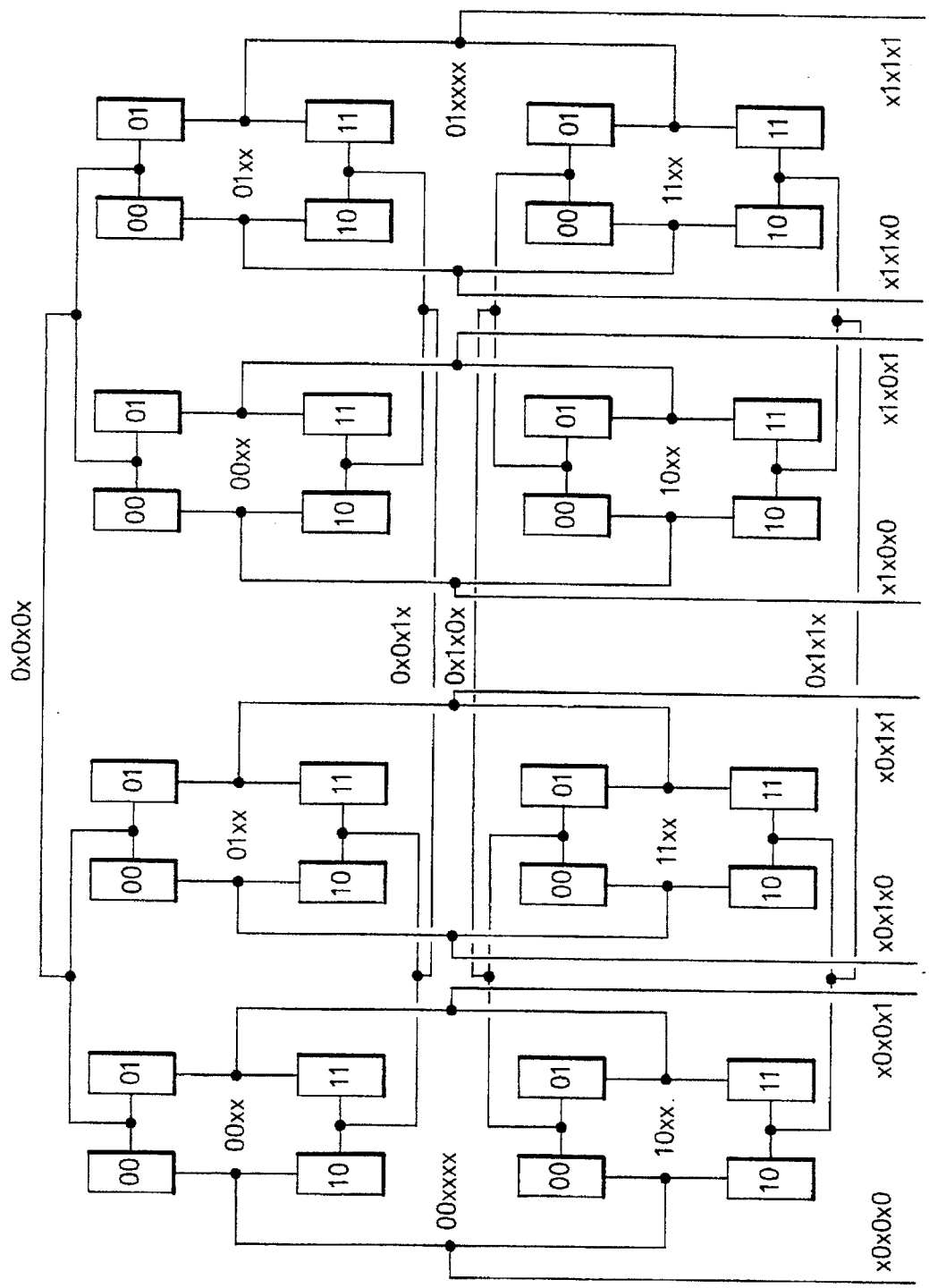

In FIG. 7 we are looking at the 6 dimensional binary cube implemented in H-DOT with two-port PEs. Also, one may notice that the maximum moves for sending a message from any one of the 64 elements to any other is two moves. And, each double H-DOT connects to eight PEs.

At some point, the H-DOT becomes ineffective because of the problems of large wire-dot nets, and the potential for collisions on them in high message densities. This may limit the application of H-DOT in binary n-cubes to relatively small arrays where the number- of PEs per H-DOT is 32 or so. Sinking current in large dot-OR networks becomes an issue. This statement applies specifically to binary cubes; however, interposing a transceiver in the net at some point removes some of these issues. The NEWS network does not have this problem because it remains a 2 dimensional array no matter how extensive it is, although random communication must traverse more intermediate nodes.

ROUTING ALGORITHM FOR BINARY N-CUBE

Notice in FIG. 6 and FIG. 7 that each element and each H-DOT is identified. The upper left element is numbered 0000, and one of its links is numbered x0x0. The link name is the reference to all the elements attached to it. The accept algorithm for a routed transfer mechanization is based on these link names.

When an element finds a message that is active on one of its links, one and only one of the elements must accept it. Our algorithm is incredibly simple, "Accept the message when the destination matches the back side link name." Four destinations match link x0x0. They are 0000, 1000, 0010, and 1010. Notice that the front and back side links are orthogonal to each other, and a destination matches only one link.

After an element of the array has chosen to accept a message, it keeps it if the destination address matches its address, "else" it passes it on.

When an element of the array needs to originate a message, the destination address will match only one of the two attached H-DOT net names. That is the port on which to start the message.

The following is a summary of the implementation of H-DOT on binary n-cubes:

| | | | | Simul. Cycles | |
|---|---|---|---|---|---|
| Dim | Elements | Links | Taps/Link | Best | Worst |
| 1 | 2 | 1 | 2 | | |
| 2 | 4 | 4 | 2 | | |
| 3 | 8 | 6 | 4 | | |
| 4 | 16 | 8 | 4 | 4 | 8 |
| 5 | 32 | 12 | 8 | | |
| 6 | 64 | 16 | 8 | | |
| 7 | 128 | 24 | 16 | | |
| 8 | 256 | 32 | 16 | | |
| 9 | 512 | 48 | 32 | | |
| 10 | 1024 | 64 | 32 | 32 | 64 (if all first moves are in 1 axis) |

By way of explanation, the column called "DIM" is the dimension of the binary n-cube. "Elements" is the number of PEs or elements that make up a binary n-cube of this dimension. "Links" is the total number of separate nets or groups of interconnected ports needed to implement the binary n-cube of dimension shown when using the H-DOT interconnection scheme. "Taps/link" is the number of taps or ports in each link. Finally, the last two columns show the minimum and maximum number of cycles needed to simultaneously move data from all elements to the elements in one specific direction. The term "Link" refers to one of the DOTTed networks that tie PEs together.

Base4 N-cube

There is growing interest in implementations of higher order N-cubes. Interconnection economies are driving this interest. Our H-DOT concept meshes exactly with higher order N-cubes. For simplicity, we explain the Base 4 n-cube from full implementation, through sparse implementation and finally to a sparse Base 4 n-cube implemented using H-DOT.

Figure 8:
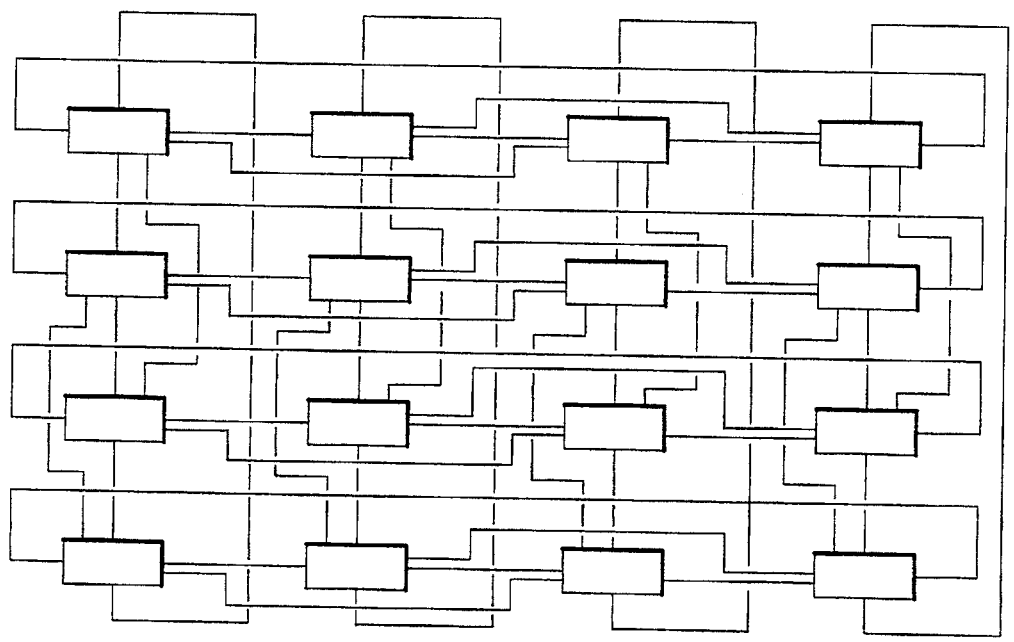
FIG. 8 shows a conventional base4 n-cube. There is a path to all PEs that have one base4 address digit that is different from the first PE.

FIG. 8 shows the standard base4 n-cube. Each PE has a connection to another PE if its address matches the other PE"s address in all but one digit. 2 dimensional base4 n-cube has the following 16 elements: 00, 01, 02, 03, 10, 11, 12, 13, 20, 21, 22, 23, 30, 31, 32, and 33. In a base4 n-cube, element 00 will connect directly with 01, 02, 03, 10, 20, and 30. This rule applies to the other PEs as well. Thus, each PE has 6 ports.

Sparse Base4 N cube

Figure 9:
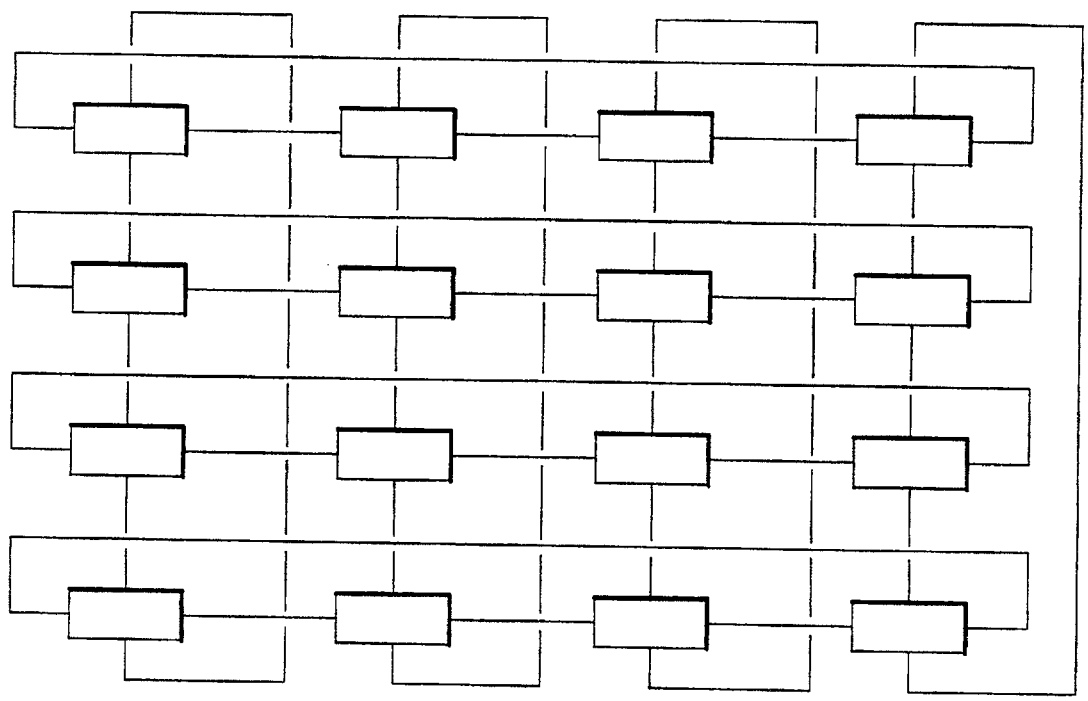
FIG. 9 shows a sparse base4 n-cube. There is a path only to the PEs that have one base4 address digit that is different by one address from the first PE.

We introduce the idea of sparseness to the 2 dimensional base4 n-cube. To reduce the number of links and to make an array easier to implement, some designers have proposed to simply take out some of the links. This is done by restricting the connections to PEs with all but one digit matching to the two adjacent PEs in that dimension. In the above example, PE 00 then has connections restricted to 01, 03, and 10, and 13. FIG. 9 shows this.

H-DOT Implemented Base4 N-cube

Figure 10:
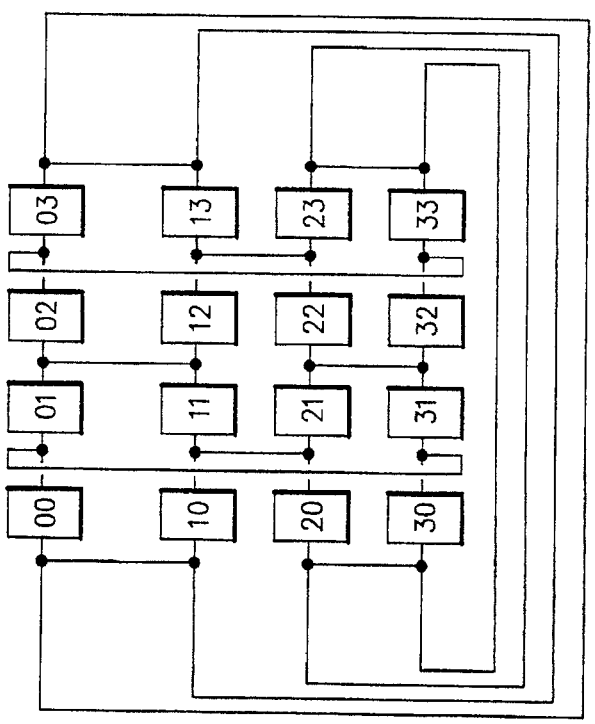
FIG. 10 shows the sparse base4 n-cube that has been implemented with H-DOT connections. The PEa each have 2 ports.

We implement the sparse 2 dimensional base4 n-cube in an H-DOT mechanization using 2 port PEs. The result is shown in FIG. 10. This is quite a simplification in ports and networks over the implementation of FIG. 8. Remember, of course, that paths are being shared, and more cycles are required. This array can easily be extended to more dimensions as was shown with the Base2 N-cube.

H-Dot Octal N-cube

Figure 11:
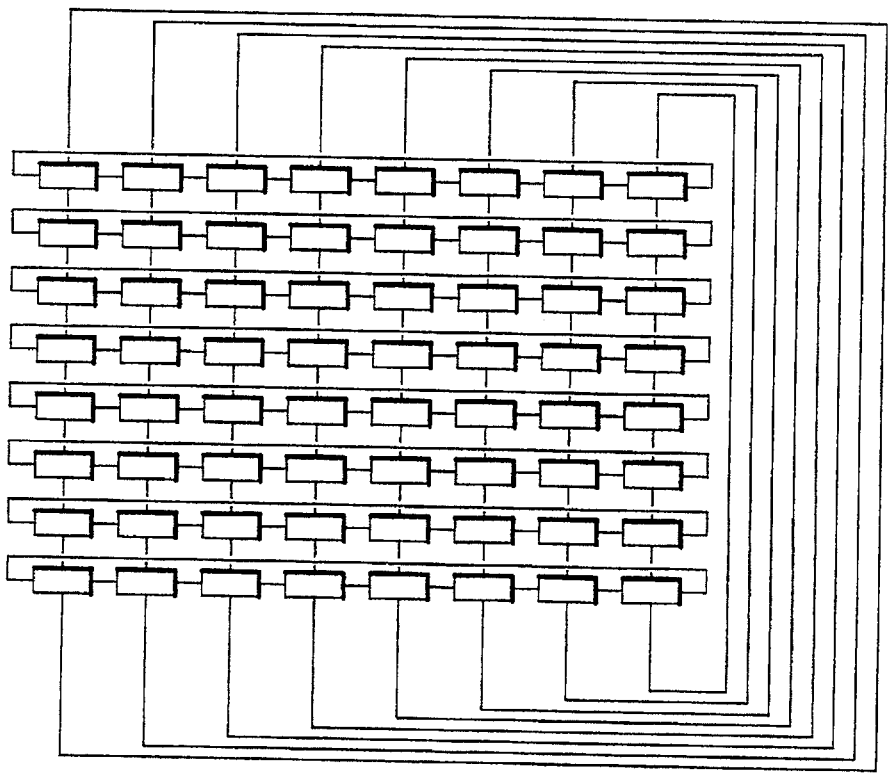
FIG. 11 carries the sparse n-cube idea to base 8 and shows such a topology.

A close relative of the binary and base4 N-cube is the octal n-cube which has eight instead of two or four elements in each strip of the array. FIG. 11 shows a conventionally connected sparse 2D octal n-cube. The element of a 2D octal array has a pair of connections for each dimension, one for plus and one for minus. Another pair is added for each additional dimension, as in the binary cube.

Figure 12:
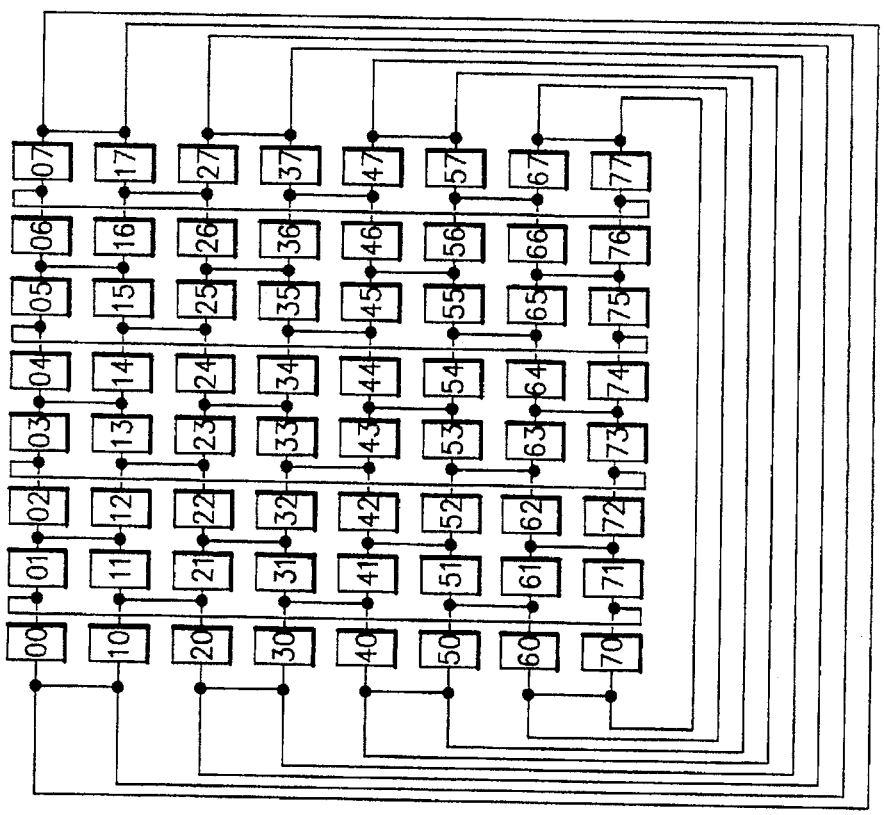
FIG. 12 shows the sparse octal n-cube implemented using H-DOT connections. Again, the PEa have 2 ports.

FIG. 12 shows the H-DOT equivalent of the sparse 2D octal n-cube. All of the prior advantages apply including reduced pin count, enhanced connectivity, and extensibility.

The following is a summary of the implementation of H-DOT to octal n-cubes:

| | | | | Simul. Cycles | |
|---|---|---|---|---|---|
| Dim | Elements | Taps/wireDot | wireDots | Best | Worst |
| 1 | 8 | 2 | 8 | 4 | |
| 2 | 64 | 4 | 32 | 4 | |
| 3 | 512 | 8 | 128 | 4 | |
| 4 | 4096 | 16 | 512 | | |
| 5 | 32768 | 32 | 2048 | | |

The H-DOT interconnect topology is even better applied to n-cubes with higher bases. With an octal (8) base, we can get to a respectable 4096 element array in four dimensions. Distance, even with path conflicts, remains small. The best case distance between any two elements of two dimensional octal n-cube is 8 for conventional topology and 4 for the H-DOT topology. This is a factor of 2 improvement.

H-Dot Octal N-cube Routing Algorithm

The N-Cube topology generally uses routed message transfer techniques as opposed to synchronous techniques. We have explained n-cubes of different bases, and have introduced sparseness and our H-dot implementation of a sparse octal N-cube.

We proceed to the routing algorithm for a multidimensional octal n-cube. There are three pads to the routing algorithm. They are: initiate message transfer, accept a message, and keep a message. Remember, with sparseness, there was a cost. The cost is the additional transfers to get to the target PE after an address digit has been chosen to make a match.

Routing algorithm instructions are:

1. INITIATE—The PE will initiate a message using the port closest to the destination in a given unmatched digit. Referring to FIG. 12, PE(22) has a message for PE(34). PE will send the message out the port toward PE(23). Thus, PE(42) Right port would be used if Dest X is greater than Element X or if DX=EX and DY>EY. (D for destination, E for this Element)

2. ACCEPT—A message would be accepted if the address matches the PE or if the PE can move the message closer to the destination. Thus, PE(42) Accepts From the Left if DX=>EX and DY=<EX 3. KEEP—Keep the message if it is for the PE, else pass it on out the other port.

Note that as with the mesh routing, there are four different sets of routing criteria depending on the PE"s position on the H-dot.

Figure 14:
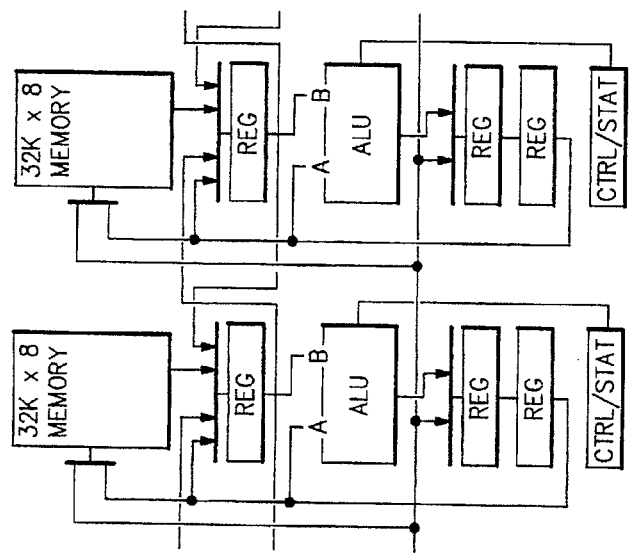
FIG. 14 shows the picket PME we have described.
Figure 13:
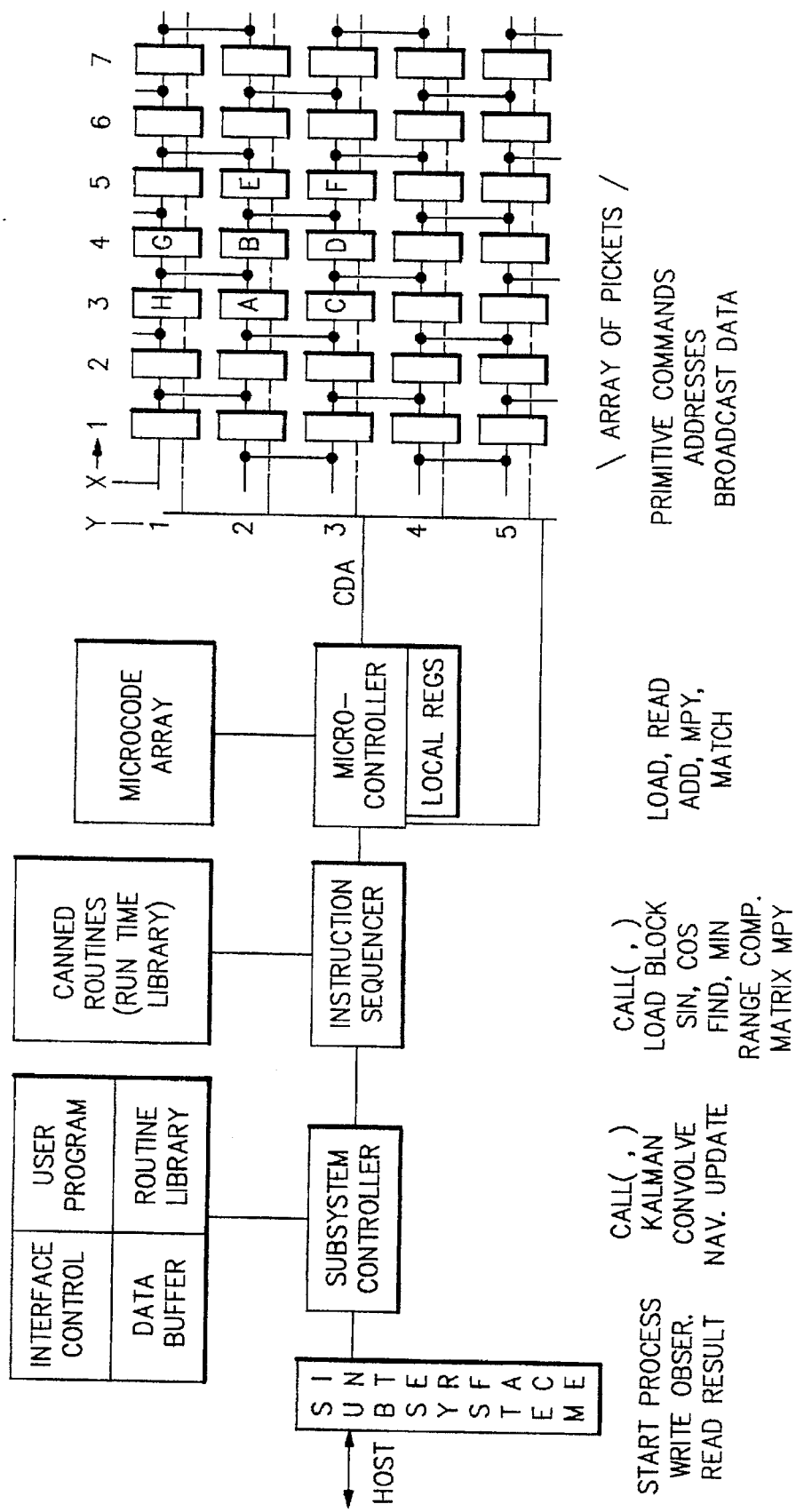

FIG. 13 shows a block diagram of a parallel array processor we have described with a 2-D H-dot array, while FIG. 14 shows the picket PME we have described. As we have already described these FIGURES above, with additional details in related applications, we will need not repeat the descriptions, which are incorporated by reference. The system is a parallel array processor which provides SIMD/MIMD operational characteristics. The picket PMEs do not have to contain an entire operating system, but can function in MIMD mode independently, and also in a SIMD mode, with the capability of dynamic switching. Each picket has configuration we have described earlier and elsewhere.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A parallel SIMD or MIMD array processor communication network, comprising:

a plurality of processing elements interconnected in an array topology configuration, each of the processing elements having at least two ports for communication with other processing elements;

a plurality of physical links, each physical link providing an interconnection among four processing elements of said plurality of processing elements, said physical link having four ports respectively coupled to one of the ports for each of the four processing elements, and having a common low impedance connection among the four ports of the physical link such that any said one of the ports for each of the four processing elements is coupled by a low impedance path through said physical link to another one of the ports of the four processing elements over the physical link, and wherein said physical link is independent of providing a common, physical bus interconnection between a first, second, and third processing element for any identically specified direction and dimension relationship, according to the array topology, between the first and the second processing element and between the second and the third processing element; and a communications control mechanism in each of the four processing elements operative in transferring a message from one of the four processing elements to another one of the four processing elements over the physical link.

2. An array processor communication network according to claim 1 wherein the array topology configuration is represented by a plurality of dimensions, and an address of each processing element is represented as a series of digits with each digit representing a location of the processing element in one of the plurality of dimensions, and wherein the physical link connects together processing elements that have addresses differing in only 1 address digit.

3. An array processor communication network according to claim 1 wherein the array topology configuration is a two dimensional mesh topology.

4. A two dimensional array processor communication network according to claim 3 wherein the plurality of processing elements are interconnected to provide for a first processing element to interconnect to a nearest neighbor processing element by a common physical link that provides two logical vertical paths and two logical horizontal paths, one of the two logical vertical paths being between the first processing element and a second processing element, the other of the two logical vertical paths being between a third processing element and a fourth processing element, one of the two logical horizontal paths being between the first processing element and the third processing element, the other of the logical horizontal paths being between the second processing element and the fourth processing element, thereby forming an H connection.

5. An array processor communication network according to claim 1 wherein the array topology configuration is a three dimensional mesh topology.

6. An array processor communication network according to claim 1 wherein the array topology configuration is a mesh topology of more than 3 dimensions.

7. An array processor communication network according to claim 1 wherein the array topology configuration is a binary n-cube topology.

8. An array processor communication network according to claim 1 wherein the array topology configuration is a sparse Base 4 n-cube topology.

9. An array processor communication network according to claim 1 wherein the way topology configuration is a sparse n-cube having a base greater than two.

10. An array processor communication network according to claim 1 wherein the communication control mechanism is operative in transferring messages of the synchronous type or of the routed type.

11. An array processor communication network according to claim 10, wherein said communications control mechanism includes a routing algorithm executed by the processing elements for transferring messages of the routed type, wherein said routing algorithm comprises an ACCEPT routine, and a KEEP routine.

12. An array processor communication network according to claim 11 wherein each processing element has a two ports, and wherein the routing KEEP routine of a given processing element having a given address is implemented by keeping a message containing a destination address received at one of the two ports if the destination address matches the given address, else passing the message out the other of the two ports.

13. An array processor communication network according to claim 11 wherein the routing ACCEPT routine of a processing element determines when the processing element should access a message on either of two ports of the processing element.

14. An array processor communication network according to claim 13 where the processing element having a first address has ports to a multidimensional quadrant, and the routing ACCEPT routine accepts a message having a given address if the given address is either the first address of the processing element, or else an address of any processing element located in the multidimensional quadrant.

15. An array processor communication network according to claim 1 where the array can be extended in area or in dimensions by adding to the existing interconnection network, or by adding additional networks.

16. The array processor communication network according to claim 1, further comprising an array controller coupled to each of the processing elements, and wherein said communication control mechanism is operative in transferring messages of the synchronous type in response to a signal received from the array controller.

17. The array processor communication network according to claim 1, wherein said communication control mechanism is operative in transferring messages of the routed type according to a routing control algorithm executed by the processing elements.

18. A parallel SIMD or MIMD array processor communication network, comprising:

a plurality of processing elements interconnected in an array topology configuration, each of the processing elements having at least two ports for communication with other processing elements;

a physical link providing an interconnection among four processing elements of said plurality of processing elements, said physical link having four ports respectively coupled to one of the ports for each of the four processing elements, and having a common low impedance connection among the four ports of the physical link such that any said one of the ports for each of the four processing elements is coupled by a low impedance path through said physical link to another one of the ports of the four processing elements over the physical link; and a communications control mechanism in each of the four processing elements operative in transferring a message of the synchronous type or of the routed type from one of the four processing elements to another one of the four processing elements over the physical link;

wherein said communications control mechanism includes a routing algorithm executed by the processing elements for transferring messages of the routed type, wherein said routing algorithm comprises an ACCEPT routine, and a KEEP routine, wherein the routing ACCEPT routine of a processing element determines when the processing element should access a message on either of two ports of the processing element; and wherein one of said processing elements having a first address has ports to a multidimensional quadrant, and the routing ACCEPT routine accepts a message having a given address if the given address is either the first address of the processing element, or else an address of any processing element located in the multidimensional quadrant.

* * * * *